United States Patent
Wu et al.

(10) Patent No.: US 11,337,111 B2
(45) Date of Patent: May 17, 2022

(54) METHOD OF ASSEMBLING SEGMENTS AND RECEIVING END

(71) Applicant: VIVO MOBILE COMMUNICATION CO., LTD., Guangdong (CN)

(72) Inventors: Yumin Wu, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 295 days.

(21) Appl. No.: 16/498,176

(22) PCT Filed: Jan. 31, 2018

(86) PCT No.: PCT/CN2018/074676
§ 371 (c)(1),
(2) Date: Sep. 26, 2019

(87) PCT Pub. No.: WO2018/177021
PCT Pub. Date: Oct. 4, 2018

(65) Prior Publication Data
US 2020/0275312 A1    Aug. 27, 2020

(30) Foreign Application Priority Data
Mar. 31, 2017  (CN) .......................... 201710210459.8

(51) Int. Cl.
*H04W 28/06*  (2009.01)
(52) U.S. Cl.
CPC ................................. *H04W 28/065* (2013.01)
(58) Field of Classification Search
CPC .................................................. H04W 28/065
See application file for complete search history.

(56) References Cited

U.S. PATENT DOCUMENTS

2008/0148136 A1   6/2008  Bae et al.
2008/0225765 A1*  9/2008  Marinier ............... H04B 7/155
                                                370/310
(Continued)

FOREIGN PATENT DOCUMENTS

CN    101227483 A    7/2008
CN    101330492 A   12/2008
(Continued)

OTHER PUBLICATIONS

European Search Report in Application No. 18777245.4 dated Feb. 24, 2020.
(Continued)

*Primary Examiner* — Christopher M Crutchfield
*Assistant Examiner* — Tito Q Pham
(74) *Attorney, Agent, or Firm* — Maschoff Brennan

(57) ABSTRACT

A method of assembling segments and a receiving end are provided. The method includes: determining, in the case that the receiving end receives a target data packet at a RLC layer, whether the target data packet is a segment of a RLC data packet based on a header of the target data packet; arranging the segment of the RLC data packet received by the receiving end, in the case that the target data packet is the segment of the RLC data packet; assembling, in the case that the receiving end receives all segments of the RLC data packet, all segments of the RLC data packet to obtain the RLC data packet; and delivering the RLC data packet to a PDCP layer.

20 Claims, 10 Drawing Sheets

(56) References Cited

U.S. PATENT DOCUMENTS

| | | |
|---|---|---|
| 2010/0189059 A1 | 7/2010 | Yang et al. |
| 2011/0038313 A1 | 2/2011 | Park et al. |
| 2011/0051664 A1* | 3/2011 | Kim .................. H04L 1/1851 370/328 |
| 2011/0110343 A1* | 5/2011 | Venkatachalam .................. H04W 36/0038 370/338 |
| 2013/0250853 A1 | 9/2013 | Eravelli et al. |
| 2015/0264615 A1 | 9/2015 | Zhao et al. |
| 2017/0085492 A1 | 3/2017 | Xiao et al. |
| 2017/0303170 A1* | 10/2017 | Uchino .................. H04W 76/15 |
| 2017/0310421 A1* | 10/2017 | Froberg ................ H04L 1/1874 |
| 2018/0324644 A1* | 11/2018 | Koskinen ............. H04W 80/02 |

FOREIGN PATENT DOCUMENTS

| | | |
|---|---|---|
| CN | 101729525 A | 6/2010 |
| CN | 101841856 A | 9/2010 |
| CN | 101895372 A | 11/2010 |
| CN | 101925116 A | 12/2010 |
| CN | 101932004 A | 12/2010 |
| CN | 102638328 A | 8/2012 |
| CN | 104935413 A | 9/2015 |
| CN | 105704197 A | 6/2016 |
| CN | 106470497 A | 3/2017 |
| WO | 2010/080908 A2 | 7/2010 |

OTHER PUBLICATIONS

CN Office Action in Application No. 201710210459.8 dated Jan. 3, 2020.
CN Search Report in Application No. 201710210459.8 dated Apr. 15, 2019.
"Segmentation in NR" Intel Corporation, WG2 Meeting #97, Apr. 3, 2017.
"RLC UM operation in NR" Intel Corporation, WG2 Meeting #97, Apr. 3, 2017.
Written Opinion and International Search Report in Application No. PCT/CN2018/074676 dated Oct. 10, 2019.
CN Office action dated May 24, 2019 as received in Application No. 201710210459.8.
Indian Office Action issued in corresponding application No. 201927044186, dated Jun. 22, 2021.

* cited by examiner

METHOD OF ASSEMBLING SEGMENTS AND RECEIVING END

CROSS-REFERENCE TO RELATED APPLICATION

The present application is the U.S. national phase of PCT Application PCT/CN2018/074676 filed on Jan. 31, 2018, which claims a priority of the Chinese patent application No. 201710210459.8 filed on Mar. 31, 2017, a disclosure of which is incorporated herein by reference in its entirety.

TECHNICAL FIELD

This disclosure relates to the field of communication technology, in particular to a method of assembling segments and a receiving end.

BACKGROUND

As communication technology develops, more and more types of service data that need to be transmitted in communication system emerge and the various types of service data place different demands on transmission performance. To satisfy the demands of certain services, the concept of data segmentation is introduced in the art, i.e., one packet is allowed to be transmitted via multiple segments. Radio Link Control (RLC) layer is an important protocol layer in communication system, which is responsible for delivering data transferred from Media Access Control (MAC) to Packet Data Convergence Protocol (PDCP) layer. It is found in practice that, assembling the segments at RLC layer may improve the transmission performance of communication system. It follows that how to assemble the segments at RLC layer remains an urgent technical problem to be solved.

SUMMARY

In order to solve how to assemble segments at a RLC layer, a method of assembling segments and a receiving end are provided in the present disclosure.

In a first aspect, a method of assembling segments is provided in the present disclosure, applied to a receiving end and including:

determining, in the case that the receiving end receives a target data packet at a Radio Link Control (RLC) layer, whether the target data packet is a segment of a RLC data packet based on a header of the target data packet;

arranging the segment of the RLC data packet received by the receiving end, in the case that the target data packet is the segment of the RLC data packet;

assembling, in the case that the receiving end receives all segments of the RLC data packet, all segments of the RLC data packet to obtain the RLC data packet; and delivering the RLC data packet to a Packet Data Convergence Protocol (PDCP) layer.

In a second aspect, a receiving end is further provided in the present disclosure, including:

a first segment determination module, configured to determine, in the case that the receiving end receives a target data packet at a Radio Link Control (RLC) layer, whether the target data packet is a segment of a RLC data packet based on a header of the target data packet;

a segment arrangement module, configured to arrange the segment of the RLC data packet received by the receiving end in the case that the target data packet is the segment of the RLC data packet;

an assembly module, configured to assemble, in the case that the receiving end receives all segments of the RLC data packet, all segments of the RLC data packet to obtain the RLC data packet; and a delivery module, configured to deliver the RLC data packet to a Packet Data Convergence Protocol (PDCP) layer.

Therefore, according to the present disclosure, in the case that the receiving end receives a target data packet at a RLC layer, the receiving end determines whether the target data packet is a segment of a RLC data packet based on a header of the target data packet; in the case that the target data packet is a segment of the RLC data packet, the receiving end arranges the segment of the RLC data packet received by the receiving end; in the case that the receiving end receives all segments of the RLC data packet, the receiving end assembles all segments of the RLC data packet to obtain the RLC data packet; and the receiving end delivers the RLC data packet to a PDCP layer, thereby assembling the segments at the RLC layer, improving the transmission performance of the communication system.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

The technical solutions in embodiments of the present disclosure are described clearly and completely in conjunction with drawings in the embodiments of this disclosure. Apparently, the described embodiments are merely a part of rather than all the embodiments of this disclosure. All other embodiments obtained by a person ordinary skilled in the art based on the embodiments of this disclosure without any creative efforts fall within the protection scope of the present disclosure.

Figure 1:
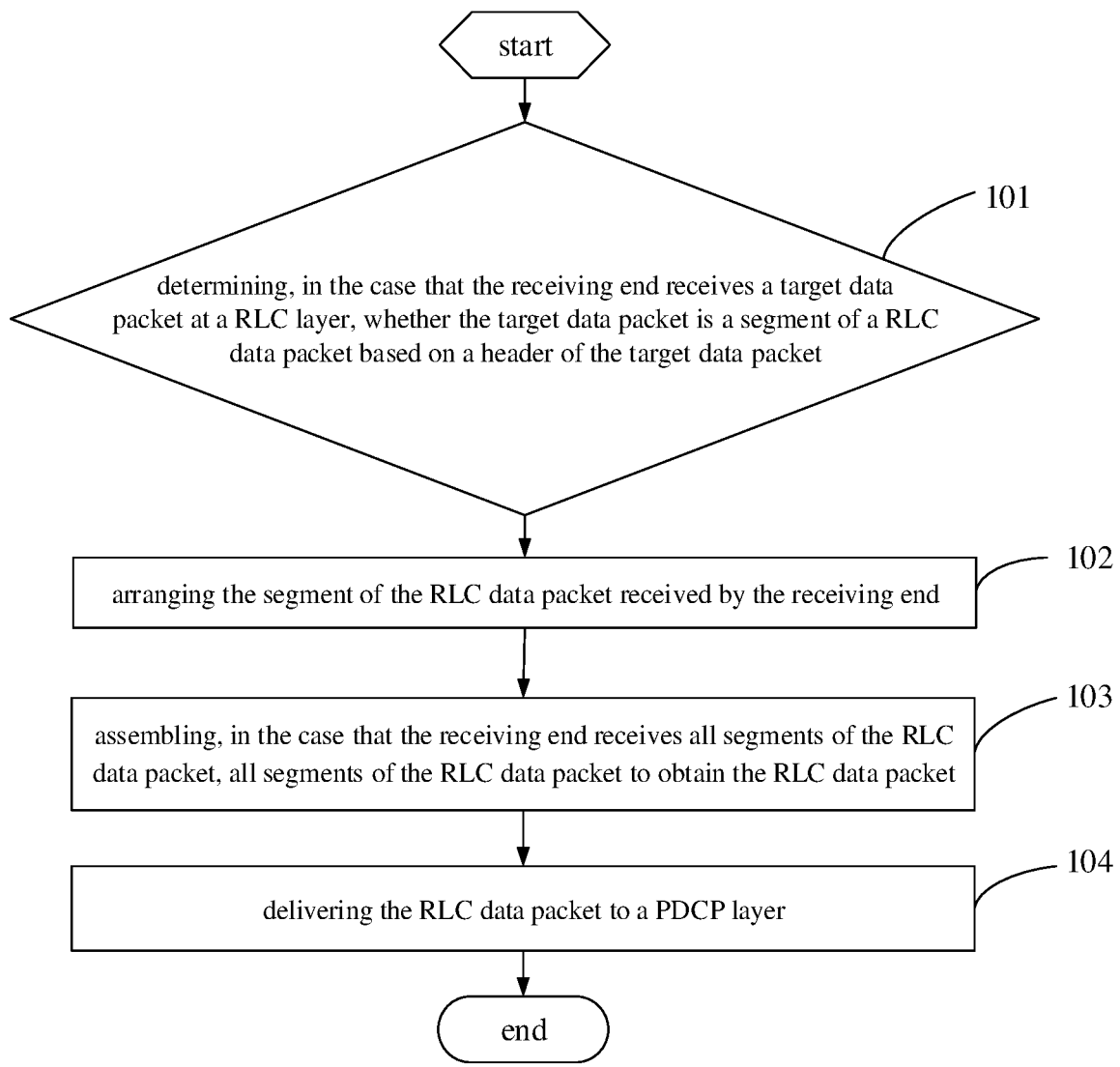
FIG. 1 is a first flow chart of a method of assembling segments in the embodiment of the present disclosure.

Referring to FIG. 1 which is a flow chart of a method of assembling segments in the embodiment of the present disclosure, the method is applied to a receiving end and, as shown in FIG. 1, the method includes the following steps:

Step 101, determining, in the case that the receiving end receives a target data packet at a RLC layer, whether the target data packet is a segment of a RLC data packet based on a header of the target data packet; if so, proceeding to step 102, otherwise terminating the process or delivering the target data packet to a PDCP layer, where the terminating the process is illustrated for example in the drawing.

The target data packet may be any data packet delivered by a lower layer (e.g., MAC layer) to the RLC layer, and the target data packet may be or may be not a segment of a RLC data packet (e.g., may be a whole RLC data packet). The step 101 is configured to determine whether the target data packet is a segment of a RLC data packet, and if so, the assembly function is enabled, i.e., proceeding to the step 102.

Step 102, arranging the segment of the RLC data packet received by the receiving end.

The arrangement may be in a specific order or random, which is not limited by embodiments of this disclosure.

Step 103, assembling, in the case that the receiving end receives all segments of the RLC data packet, all segments of the RLC data packet to obtain the RLC data packet.

In this step, in the case that all segments of the RLC data packet are received, the receiving end assembles the segments, so as to deliver the resultant RLC data packet to the PDCP layer. Whether all segments of the RLC data packet are received may be determined based on segment identifiers or segment location information carried in the received segmented data packet of the RLC data packet.

Step 104, delivering the RLC data packet to a PDCP layer.

When the assembly process is successful, the RLC data packet may be delivered to the PDCP layer, the RLC data packet may be delivered as soon as it is assembled successfully, or the delivering of RLC data packets may be performed collectively when a quantity of successfully assembled RLC data packets reaches a threshold, which is not limited by embodiments of this disclosure.

According to embodiments of this disclosure, by means of steps 101 to 103, the assembly may be performed at RLC layer, and in particular, performed at RLC layer without the reorder detection function of RLC layer, that is, the RLC layer assembly function is achieved. The RLC layer assembly may support segmented transmission at lower layer, thereby improving transmission performance.

Further, in embodiments of this disclosure, the receiving end may be a device in a communication system that is configured to receive data packet, and certainly, the device may as well be configured to transmit data packet. For example, the receiving end may be a UE or a network-side device, wherein the UE may include a cell phone, Table Personal Computer, Laptop Computer, personal digital assistant (PDA), Mobile Internet Device (MID) or Wearable Device. The network-side device may be a Transmission Reception Point (TRP) or a base station, the base station may be a macro base station such as LTE (Long-Term Evolution) eNB and 5G NR (New Radio) NB (Node-B); or the network-side device 12 may be an access point (AP).

According to the present disclosure, in the case that the receiving end receives a target data packet at a RLC layer, the receiving end determines whether the target data packet is a segment of a RLC data packet based on a header of the target data packet; in the case that the target data packet is a segment of the RLC data packet, the receiving end arranges the segment of the RLC data packet received by the receiving end; in the case that the receiving end receives all segments of the RLC data packet, the receiving end assembles all segments of the RLC data packet to obtain the RLC data packet; and the receiving end delivers the RLC data packet to a PDCP layer, thereby assembling the segments at the RLC layer, improving the transmission performance of the communication system.

Figure 2:
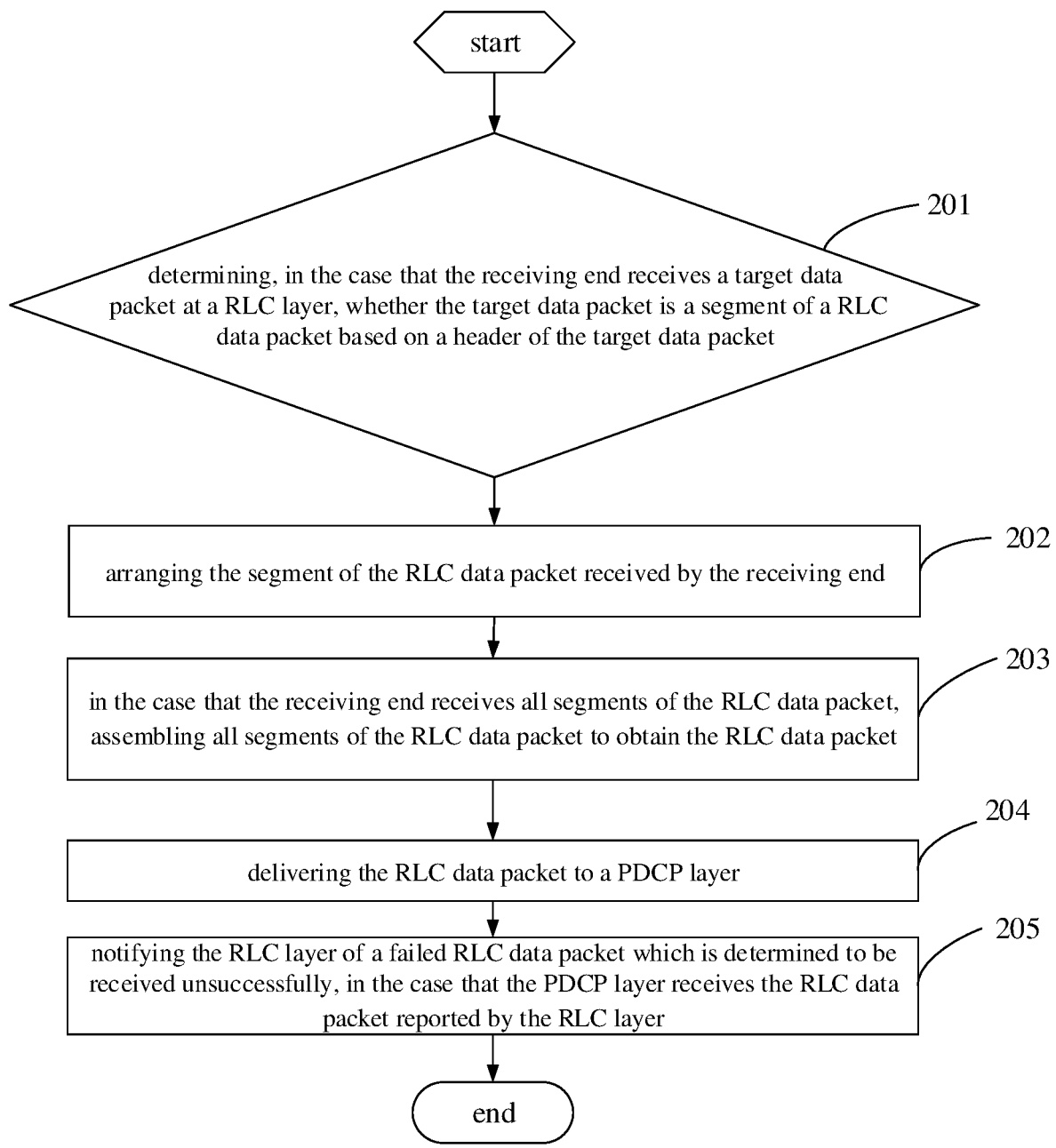
FIG. 2 is a second flow chart of a method of assembling segments in the embodiment of the present disclosure.

Referring to FIG. 2 which is a flow chart of a method of assembling segments in the embodiment of the present disclosure, the method is applied to a receiving end. A main difference between this embodiment and the embodiment as shown in FIG. 1 is that, a step is added on the basis of the embodiment as shown in FIG. 1, in which step the RLC layer is notified of the RLC data packet for which it is determined a reception failure occurs after the PDCP layer receives the RLC data packet delivered by the RLC layer. As shown in FIG. 2, the method includes the following steps.

Step 201, determining, in the case that the receiving end receives a target data packet at a RLC layer, whether the target data packet is a segment of a RLC data packet based on a header of the target data packet; if so, proceeding to step 102, otherwise terminating the process or delivering the target data packet to a PDCP layer, where the terminating the process is illustrated for example in the drawing.

The target data packet may be any data packet delivered by a lower layer (e.g., MAC layer) to the RLC layer, and the target data packet may be or may be not a segment of a RLC data packet (e.g., may be a whole RLC data packet). The step 101 is configured to determine whether the target data packet is a segment of a RLC data packet, and if so, the assembly function is enabled, i.e., proceeding to the step 102.

It is noted, in the embodiments of this disclosure, the RLC data packet may be understood as a RLC Service Data Unit (SDU).

Optionally, the determining whether the target data packet is a segment of the RLC data packet based on the header of the target data packet includes: determining whether the header of the target data packet includes a format indication of a segmented packet, and determining that the target data packet is the segment of the RLC data packet in the case that the header of the target data packet includes the format indication of the segmented packet; or determining whether the header of the target data packet includes segment position information, and determining that the target data packet is the segment of the RLC data packet in the case that the header of the target data packet includes the segment position information.

The format indication may be configured to indicate that the target data packet is a segmented data packet of the RLC data packet, so that the target data packet may be indicated explicitly to be a segment of the RLC data packet; while the step of determining that the target data packet is a segment of the RLC data packet based on the segment position information is configured to indicate implicitly that the target data packet is the RLC data packet, which may reduce header overhead since additional format indication may be omitted from the header.

Optionally, prior to the determining whether the target data packet is a segment of the RLC data packet based on the header of the target data packet, the method further includes:

in the case that the receiving end receives the target data packet at the RLC layer, determining whether the target data packet is a duplicated RLC data packet based on a number of the target data packet; in the case that the target data packet is the duplicated RLC data packet, discarding the target data packet; and in the case that the target data packet isn't the duplicated RLC data packet, performing the step of determining whether the target data packet is a segment of the RLC data packet based on the header of the target data packet.

In the embodiment, in the case that a target data packet is received, it is determined whether the target data packet is a duplicated RLC data packet, and if so, i.e., the target data packet has been received, the target data packet is discarded to avoid storage space being wasted on the generation of RLC data packet, thereby conserving the storage space. Whether the target data packet is a duplicated RLC data packet may be determined based on status information stored or recorded by the receiving end, e.g., by determining whether the target data packet is a data packet which has already been delivered to the PDCP layer, or by determining whether the target data packet is a data packet which has been assembled successfully, etc., which is not limited by embodiments of this disclosure.

Optionally, in the embodiment, the method further includes: recording status information of the RLC layer, where the status information includes status and numbers of RLC data packets within a preset length range of numbers, and the status of the RLC data packets include: delivered to the PDCP layer, assembled successfully, being assembled or not received.

The preset length range of numbers may be specified in protocol, e.g., it is specified in protocol that a quantity of numbers, recorded at the receiving end, of RLC data packets is half of a maximum RLC number, that is, if the maximum number is 10, then up to 5 numbers may be stored at the receiving end. Further, in embodiments of this disclosure, the number may also be called sequence number (SN). Alternatively, the preset length range of numbers is configured in advance at the receiving end, e.g., configured as 5, 6 or 7, that is, the receiving end may only record numbers of 5, 6 or 7 data packets at a time. Of course, the data packets within the preset length range of numbers vary with time or when data packet is received. For example, the receiving end at first records status of data packet with numbers 1 to 5, and the five data packets may include data packets delivered to the PDCP layer, assembled successfully, being assembled and/or not received, i.e., some of the five data packets may be the data packets delivered to the PDCP layer, the data packets assembled successfully, the data packets being assembled or the data packets not received. However, due to the variation with time or when data packet is received, the receiving end may instead record data packets with numbers 2 to 6, numbers 3 to 7, numbers 4 to 8, numbers 5 to 9, numbers 6 to 10 and numbers 7 to 1, where a maximum number of 10 is taken as an example, that is, upon 10 is reached, the number reverts back to 1 and the numbering resumes.

In the embodiment, status of data packets may be acquired timely by recording status information of the RLC layer, so as to facilitate the receiving end to process the data packets flexibly, thus improving flexibility of the system.

Optionally, in the embodiment, the method further includes: determining an upper-limit number and a lower-limit number of the preset length range of numbers.

The sequence of the step of recording status information of the RLC layer and the step of determining the upper-limit number and the lower-limit number of the preset length range of numbers is not limited, i.e., the recording step may precede the determining step, the determining step may precede the recording step or the steps may be performed simultaneously. In the embodiment, since the upper-limit number and the lower-limit number of the preset length range of numbers are determined, it may be ensured effectively that the receiving end only records status and numbers of RLC data packets within the preset length range of numbers, thus conserving storage space of the receiving end.

Optionally, in the case that a number of a received data packet does not revert, the upper-limit number of the preset length range of numbers is: a maximum number among numbers of received data packets, the maximum number among the numbers of the received data packets plus 1, the maximum number among the numbers of the received data packets minus 1, or the lower-limit number of the preset length range of numbers plus the preset length range of numbers minus 1.

In the case that a number of a received data packet reverts, the upper-limit number of the preset length range of numbers is: a maximum number among reverted numbers of numbers of received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, where the first calculation result is the lower-limit number of the preset length range of numbers plus the preset length range of numbers minus 1.

Figure 3:
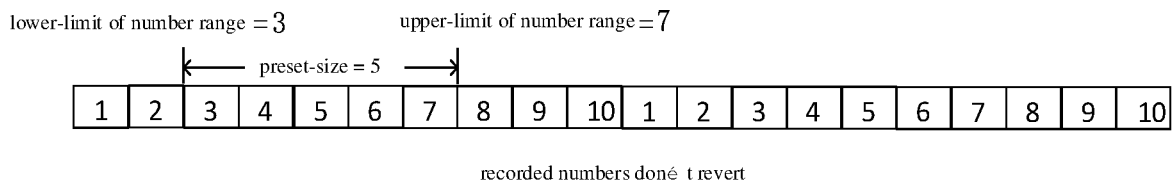
FIG. 3 is a first schematic view of a preset length range of numbers in the embodiment of the present disclosure.

In the embodiment, the upper-limit number of the preset length range of numbers may be determined accurately, to facilitate the receiving end to record accurately status of data packets within the preset length range of numbers. For example, if a number of a data packet does not revert, the preset length range of numbers is 5 and the lower-limit number is 3, the upper-limit number is: 3+5−1=7. As shown in FIG. 3, the upper-limit number and the lower-limit number of the preset length range of numbers are 3 and 7 respectively.

Figure 4:
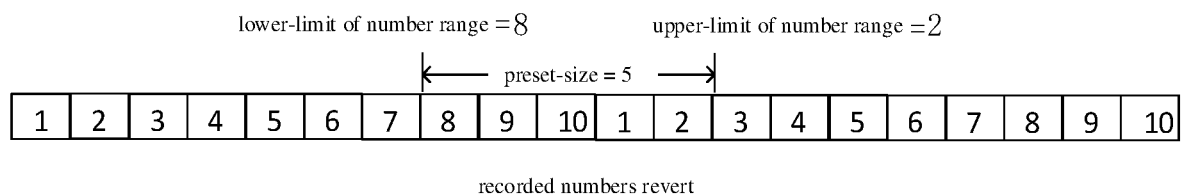
FIG. 4 is a second schematic view of a preset length range of numbers in the embodiment of the present disclosure.

For another example, if a number of a data packet reverts, the preset length range of numbers is 5 and the lower-limit number is 8, the upper-limit number is: (8+5−1) mod 5=2, where 10 is the preset maximum number. As shown in FIG. 4, the preset length range of numbers is 5, the upper-limit number and the lower-limit number of the preset length range of numbers are 8 and 2 respectively.

Optionally, in the case that a number of a received data packet does not revert, the lower-limit number of the preset length range of numbers is: a minimum number among numbers of received data packets, the minimum number among the numbers of the received data packets plus 1, the minimum number among the numbers of the received data packets minus 1, or the upper-limit number of the preset length range of numbers minus the preset length range of numbers plus 1.

In the case that a number of a received data packet has revert, the lower-limit number of the preset length range of numbers is: a minimum number among non-reverted numbers of numbers of received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, wherein the second calculation result is calculated from the upper-limit number of the preset length range of numbers minus the preset-size plus 1.

In the embodiment, the lower-limit number of the preset length range of numbers may be determined accurately, to facilitate the receiving end to record accurately status of data packets within the preset length range of numbers. For example, if the upper-limit number is 7, the lower-limit number is: 7−5+1=3. As shown in FIG. 3, the upper-limit number and the lower-limit number of the preset length range of numbers are 3 and 7 respectively.

For another example, if a number of a data packet reverts, the preset-size is 5 and the upper-limit number is 2, the lower-limit number is: 2−5+1+10=8, where 10 is the preset maximum number. That is, as shown in FIG. 4, the preset-size is 5, the upper-limit number and the lower-limit number of the preset length range of numbers are 8 and 2 respectively.

Optionally, in the implementation involving determining the upper-limit number and the lower-limit number, prior to the determining an upper-limit number and a lower-limit number of the preset length range of numbers, the method further includes: in the case that the number of the received data packet is less than or equal to the lower-limit number of the preset length range of numbers, determining that the number of the received data packet has revert; or in the case that the number of the received data packet is less than or equal to a third calculation result, determining that the number of the received data packet has revert, where the third calculation result is the lower-limit number of the preset length range of numbers minus the preset length range of numbers.

In the embodiment, whether the number of the received data packet reverts may be determined accurately, so as to determine accurately the upper-limit number and the lower-limit number of the preset length range of numbers. For example, if the preset-size is 5, the lower-limit number is 8, and the number of newly received data packet is 2, since 2<(8−5=3), it is determined the number of the data packet has reverted.

Optionally, the determining whether the target data packet is the duplicated RLC data packet based on the number of the target data packet includes: determining whether the number of the target data packet is a number of a data packet delivered to the PDCP layer, and in the case that the number of the target data packet is the number of the data packet delivered to the PDCP layer, determining that the target data packet is the duplicated RLC data packet; determining whether the number of the target data packet is a number of a data packet assembled successfully, and in the case that the number of the target data packet is the number of the data packet assembled successfully, determining that the target data packet is the duplicated RLC data packet; or determining whether there is, within the preset length range of numbers, a data packet whose number is the same as the number of the target data packet, and in the case that there is, within the preset length range of numbers, the data packet whose number is the same as the number of the target data packet, determining that the target data packet is the duplicated RLC data packet; in the case that there isn't, within the preset length range of numbers, the data packet whose number is the same as the number of the target data packet, determining that the target data packet isn't the duplicated RLC data packet.

In the embodiment, if the target data packet is the data packet delivered to the PDCP layer or the data packet assembled successfully, it is determined that the target data packet is the duplicated RLC data packet. Of course, in the case that it is determined the target data packet is neither the data packet reported to the PDCP layer nor the data packet assembled successfully, whether the target data packet is the duplicated RLC data packet may be determined by determining whether there is, within the preset length range of numbers, a data packet whose number is the same as the number of the target data packet. Certainly, whether the target data packet is the duplicated RLC data packet may be determined by determining directly whether there is, within the preset length range of numbers, a data packet whose number is the same as the number of the target data packet. The specific determination mode is not limited by embodiments of this disclosure. In the embodiment, whether the target data packet is the duplicated RLC data packet may be determined accurately through the 3 modes, so as to improve the performance of the receiving end.

Step 202, arranging the segment of the RLC data packet received by the receiving end.

Optionally, the arranging the segment of the RLC data packet received by the receiving end includes: arranging the segment of the RLC data packet received by the receiving end sequentially in an order of segmentation; or arranging the segment of the RLC data packet received by the receiving end randomly.

In the embodiment, the segments may be arranged sequentially in the order of segmentation, which facilitates an upper layer to identify the segments in a received RLC data packet assembled from the segments arranged in this way, thus improving the performance of the receiving end. While by the random arrangement, the segments may be arranged and assembled rapidly, so as to enhance the assembly efficiency.

Optionally, after the determining whether the target data packet is a segment of the RLC data packet based on the header of the target data packet, the method further includes: in the case that the target data packet is a segment of the RLC data packet, determining whether the target data packet is a duplicated segment of a segment of the RLC data packet received by the receiving end; and in the case that the target data packet is a duplicated segment of the segment of the RLC data packet received by the receiving end, discarding the target data packet.

The determining whether the target data packet is a duplicated segment of a segment of the RLC data packet received by the receiving end may include determining whether there is a segment same as the target data packet in the RLC data packet received at RLC layer, and if so, determining that the segment is received duplicatedly, i.e., the target data packet is a duplicated segment. Since the duplicated segment is discarded, the duplicated segment may be excluded from the assembly process, thus improving the correctness of assembly and conserving storage space of the receiving end.

Step 203, in the case that the receiving end receives all segments of the RLC data packet, assembling all segments of the RLC data packet to obtain the RLC data packet.

In this step, in the case that all segments of the RLC data packet are received, the receiving end assembles the segments, so as to deliver the resultant RLC data packet to the PDCP layer. Whether all segments of the RLC data packet are received may be determined based on segment identifier or segment location information carried in the received segmented data packet of the RLC data packet.

Optionally, after the determining whether the target data packet is a segment of the RLC data packet based on the header of the target data packet, the method further includes:

in the case that a timer expires, terminating an assembly of the RLC data packet, and discarding segments of the RLC data packet stored by the receiving end.

In the embodiment, in the case that a timer expires, the assembly process of the RLC data packet is terminated and segments of the RLC data packet stored by the receiving end are discarded, thereby conserving power and storage space of the receiving end. Since the expiration of the timer suggests a segment of the RLC data packet remains absent, the assembly process may not be completed, as a result, the stored segments of the RLC data packet are discarded. The duration of the first timer may be configured in advance.

Optionally, the timer includes: a timer initiated when the receiving end receives a segment of the RLC data packet for the first time; or a timer initiated in the case that the receiving end receives a segment of the RLC data packet again after receiving the segment of the RLC data packet; or a timer initiated in the case that a segment between two adjacent segments is not received after the receiving end arranges the segments of the RLC data packet received by the receiving end in the order of segmentation.

In the embodiment, a timer may be initiated when the receiving end receives a segment of the RLC data packet for the first time; the timer may be re-initiated whenever a segment of the RLC data packet is received again; and a timer may be initiated in the case that there is an unreceived segment between two sequentially arranged segments after the segment of the RLC data packet is arranged sequentially in the order of segmentation, i.e., after it is found there is a segment missed. If the first timer expires, the segments of the RLC data packet stored by the receiving end are discarded, thereby conserving storage space of the receiving end.

Optionally, the method further includes: in the case that the receiving end receives all segments of the RLC data packet and the timer has not expired, terminating the timer.

In the embodiment, since the first timer is terminated in the case that the receiving end receives all segments of the RLC data packet and the timer does not expire, the power waste due to the fact that the timer continues running despite all segments of the RLC data packet are received may be avoided; and since the first timer is terminated after the assembly process, the discard of the segment of the RLC data packet due to an expiration of the first timer after the assembly process is completed successfully and a resultant RLC data packet error may be prevented.

Step 204, delivering the RLC data packet to a PDCP layer.

When the assembly process is successful, the RLC data packet may be delivered to the PDCP layer, where the RLC data packet may be delivered as soon as it is assembled successfully, or the delivering of RLC data packets may be performed collectively when a quantity of successfully assembled RLC data packets reaches a threshold, which is not limited by embodiments of this disclosure.

Optionally, the method may further includes: step 205, notifying the RLC layer of a failed RLC data packet which is determined to be received unsuccessfully, in the case that the PDCP layer receives the RLC data packet delivered by the RLC layer.

The failed data packet may be those determined by the PDCP layer, after sorting the received RLC data packets, as failing to be received. For example, after the PDCP receives the RLC data packet delivered by the RLC layer, the PDCP layer records numbers of the received RLC data packets, sorts the received RLC data packets by number and during the course of sorting, determines whether there is a RLC data packet which failed to be received. After it is determined there is a RLC data packet which failed to be received, a second timer may be initiated, and if the second timer expires and the failed data packet still fails to be received, the RLC data packets with numbers following the number of the failed data packet are delivered successively to an upper layer and the number of the failed data packet is transferred to the RLC layer. It is noted, the RLC data packet may be considered as a PDCP data packet on PDCP layer.

By step 205, the RLC layer may be notified of the data packet which failed to be received by the PDCP layer, such that the RLC layer is aware of the reception at the PDCP layer in a timely fashion, thus improving overall performance of the receiving end.

It is noted, in embodiments of this disclosure, the execution sequence of steps 205 and 204 is not limited. In the drawing, a scenario in which step 204 precedes step 205 is illustrated as an example. In other scenarios, step 205 may precede step 204 or the steps may be performed simultaneously, as the failed data packet may precede the RLC data packet delivered in step 204.

Optionally, in the case that it is determined that the reception of the RLC data packet fails, the notifying the RLC layer of the failed RLC data packet includes: recording numbers of the RLC data packets received at the PDCP layer, determining a RLC-layer number of the failed RLC data packet which is determined to be received unsuccessfully, and notifying the RLC layer of the RLC-layer number of the failed RLC data packet.

In the embodiment, the RLC-layer number of the failed RLC data packet may be notified to the RLC layer, such that the RLC layer may determine the failed RLC data packet accurately and rapidly.

Optionally, after the, in the case that it is determined that the reception of the RLC data packet fails, notifying the RLC layer of the failed RLC data packet, the method further includes: in the case that segments of the failed RLC data packet are stored at the RLC layer, discarding the segments of the failed RLC data packet; or in the case that an assembly process of the failed RLC data packet is underway at the RLC layer, terminating the assembly process of the failed RLC data packet, terminating a timer initiated by the assembly process and discarding segments used in the assembly process of the failed RLC data packet.

In this step, having received the number of the failed data packet transmitted by PDCP layer, RLC layer may discard the stored segments of the failed data packet as it is not necessary to deliver the data packet to PDCP layer, thereby conserving storage space of the receiving end. Moreover, having received the number of the failed data packet transmitted by PDCP layer, RLC layer terminates the assembly process of the failed RLC data packet, terminates a timer initiated by the assembly process and discards stored segments of the failed data packet if the assembly process has been initiated by RLC layer, as it is not necessary to deliver the data packet to PDCP layer, thereby conserving power and storage space of the receiving end.

In embodiments of this disclosure, in the case that the receiving end receives a target data packet at an RLC layer, the receiving end determines whether the target data packet is a segment of a RLC data packet based on a header of the target data packet; in the case that the target data packet is a segment of the RLC data packet, the receiving end arranges the segment, received by the receiving end, of the RLC data packet; in the case that the receiving end receives all segments of the RLC data packet, the receiving end assembles the all segments of the RLC data packet to obtain the RLC data packet; the receiving end delivers the RLC data packet to a PDCP layer; and after the PDCP layer receives the RLC data packet delivered by the RLC layer, in the case that it is determined that a reception of the RLC data packet fails, notifying the RLC layer of the failed RLC data packet. Thereby assembling the segments at RLC layer is achieved, improving the transmission performance of communication system. Further, since the RLC layer is notified of the data packet which failed to be received by the PDCP layer, the RLC layer gets timely aware of the reception at the PDCP layer, thus improving overall performance of the receiving end.

Figure 5:
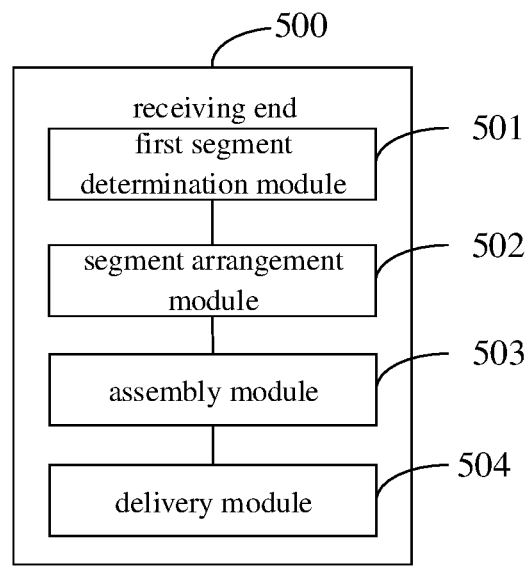
FIG. 5 is a first schematic view of a receiving end in the embodiment of the present disclosure.

Referring to FIG. 5, a schematic view of a receiving end in the embodiment of the present disclosure is illustrated. The receiving end may implement detailed steps of the method of assembling segments of embodiments as shown in FIG. 1 and FIG. 2 and achieve the same effect. As shown in FIG. 5, the receiving end 500 includes: a first segment determination module 501, a segment arrangement module 502, an assembly module 503 and a delivery module 504, where the first segment determination module 501 is connected to the segment arrangement module 502, the segment arrangement module 502 is connected to the assembly module 503 and the assembly module 503 is connected to the delivery module 504.

The first segment determination module 501 is configured to determine, in the case that the receiving end receives a target data packet at a Radio Link Control (RLC) layer, whether the target data packet is a segment of a RLC data packet based on a header of the target data packet.

The segment arrangement module 502 is configured to arrange the segment of the RLC data packet received by the receiving end in the case that the target data packet is the segment of the RLC data packet.

The assembly module 503 is configured to assemble, in the case that the receiving end receives all segments of the RLC data packet, all segments of the RLC data packet to obtain the RLC data packet.

The delivery module 504 is configured to deliver the RLC data packet to a PDCP layer.

Optionally, the first segment determination module 501 is configured to determine whether the header of the target data packet includes a format indication of a segmented packet, and determine that the target data packet is the segment of the RLC data packet in the case that the header of the target data packet includes the format indication of the segmented packet; or the first segment determination module 501 is configured to determine whether the header of the target data packet includes segment position information, and determine that the target data packet is the segment of the RLC data packet in the case that the header of the target data packet includes the segment position information.

Figure 6:
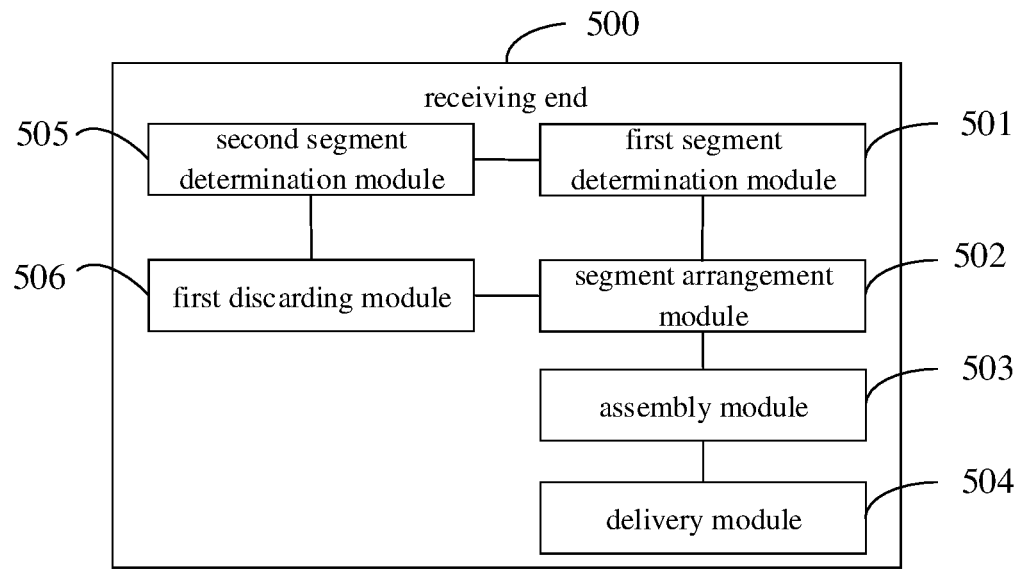
FIG. 6 is a second schematic view of a receiving end in the embodiment of the present disclosure.

Optionally, as shown in FIG. 6, the receiving end 500 further includes:

a second segment determination module 505, configured to determine whether the target data packet is a duplicated segment of the segment of the RLC data packet received by the receiving end in the case that the target data packet is the segment of the RLC data packet; and a first discarding module 506, configured to discard the target data packet in the case that the target data packet is the duplicated segment of the segment of the RLC data packet received by the receiving end.

Optionally, the segment arrangement module 502 is configured to arrange the segments of the RLC data packet received by the receiving end in an order of segmentation; or the segment arrangement module 502 is configured to arrange the segments of the RLC data packet received by the receiving end randomly.

Figure 7:
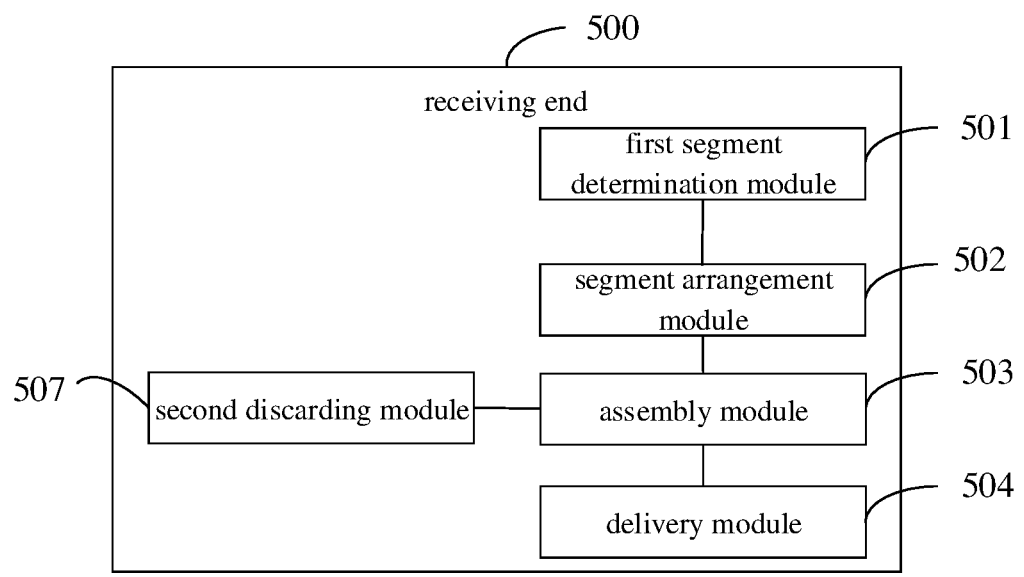
FIG. 7 is a third schematic view of a receiving end in the embodiment of the present disclosure.

Optionally, as shown in FIG. 7, the receiving end 500 further includes:

a second discarding module 507, configured to terminate an assembly of the RLC data packet and discard the segment of the RLC data packet stored by the receiving end in the case that a timer expires.

Optionally, the timer includes: a timer initiated in the case that the receiving end receives the segment of the RLC data packet for the first time; or a timer initiated in the case that the receiving end receives a segment of the RLC data packet again after receiving the segment of the RLC data packet; or a timer initiated in the case that a segment between two adjacent segments is not received after the receiving end arranges the segments of the RLC data packet received by the receiving end in the order of segmentation.

Figure 8:
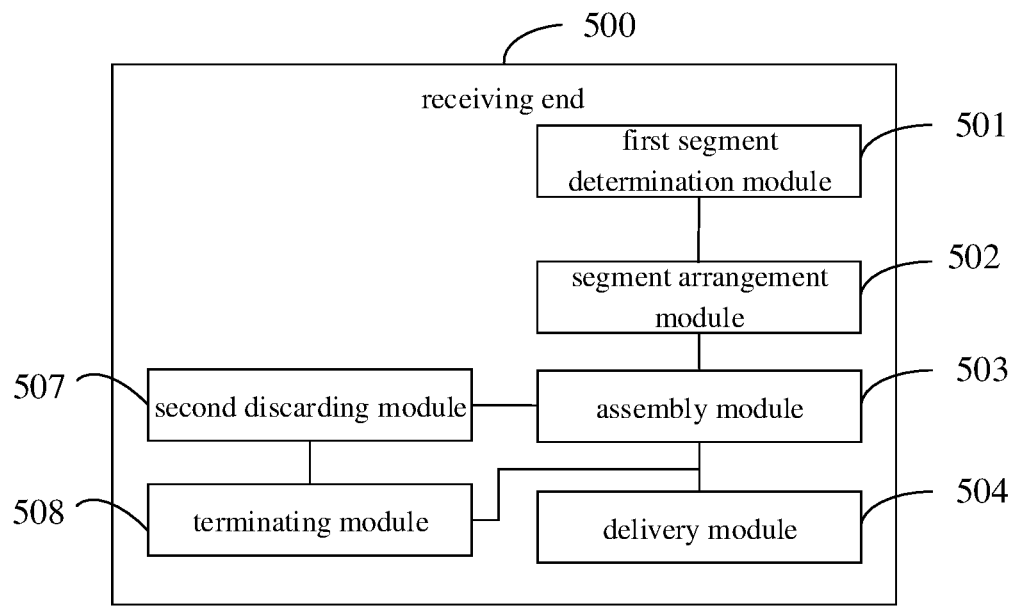
FIG. 8 is a fourth schematic view of a receiving end in the embodiment of the present disclosure.

Optionally, as shown in FIG. 8, the receiving end 500 further includes:

a terminating module 508, configured to terminate the timer in the case that the receiving end receives all segments of the RLC data packet and the timer does not expire.

Figure 9:
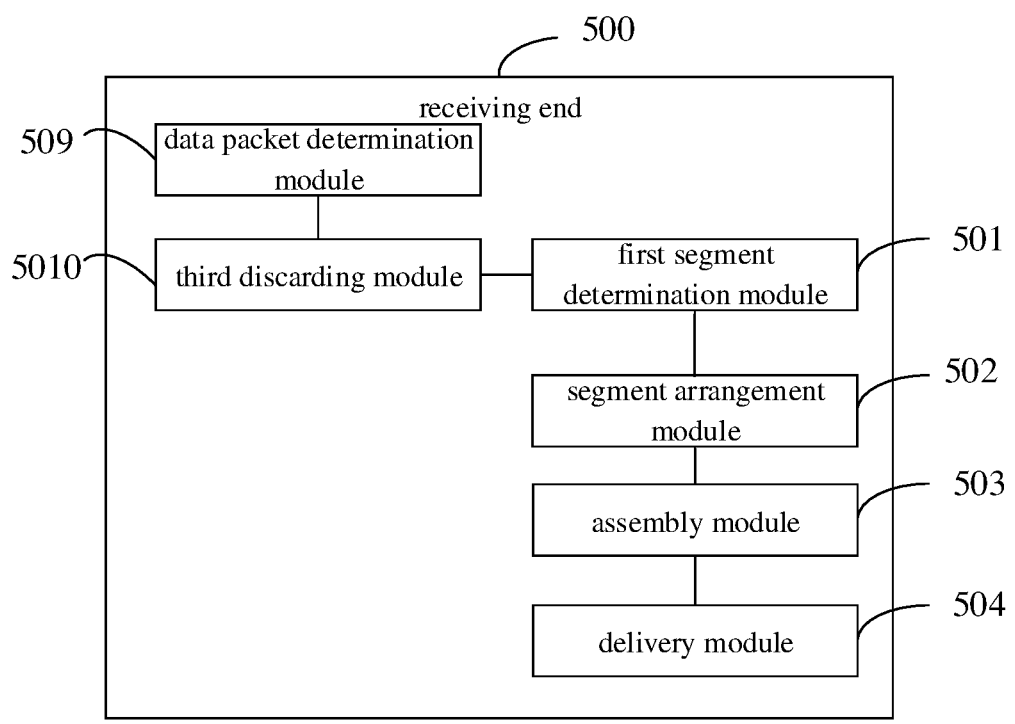
FIG. 9 is a fifth schematic view of a receiving end in the embodiment of the present disclosure.

Optionally, as shown in FIG. 9, the receiving end 500 further includes:

a data packet determination module 509, configured to determine whether the target data packet is a duplicated RLC data packet based on a number of the target data packet in the case that the receiving end receives the target data packet at the RLC layer; and a third discarding module 5010, configured to discard the target data packet in the case that the target data packet is the duplicated RLC data packet.

The first segment determination module 501 is configured to determine whether the target data packet is the segment of the RLC data packet based on the header of the target data packet in the case that the target data packet is not the duplicated RLC data packet.

Figure 10:
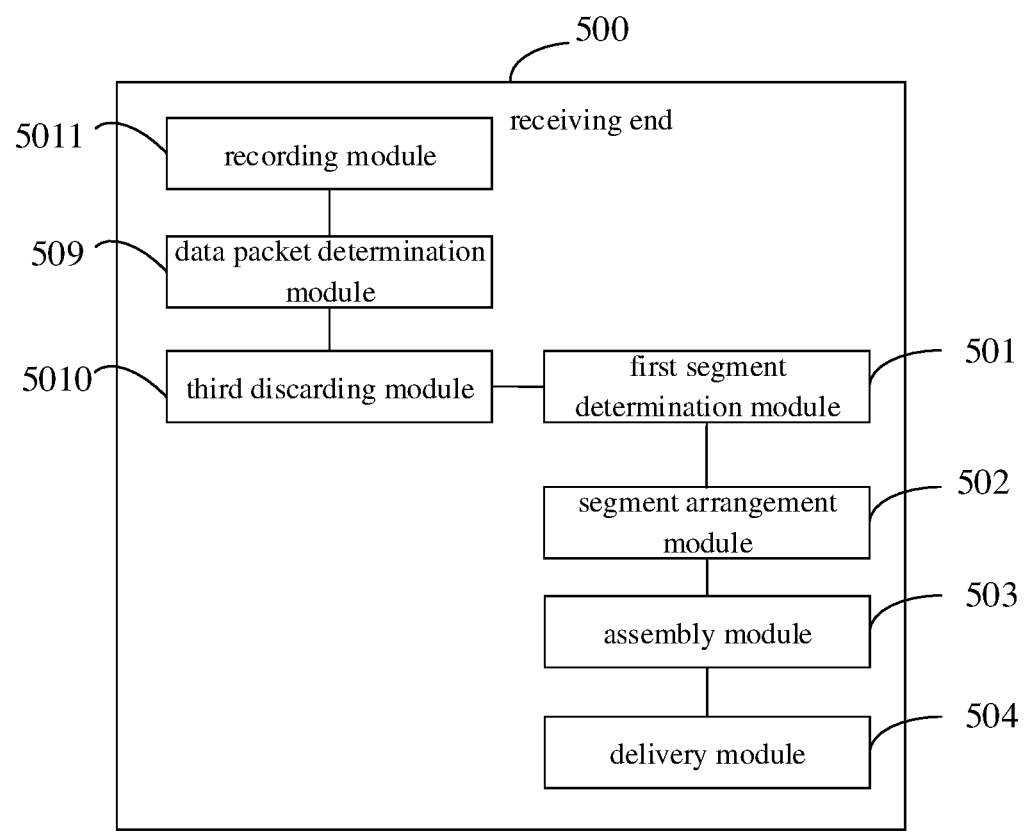
FIG. 10 is a sixth schematic view of a receiving end in the embodiment of the present disclosure.

Optionally, as shown in FIG. 10, the receiving end 500 further includes:

a recording module 5011, configured to record status information of the RLC layer.

The status information includes status and numbers of RLC data packets within a preset length range of numbers, and the status of the RLC data packets include: delivered to the PDCP layer, assembled successfully, being assembled or not received.

Figure 11:
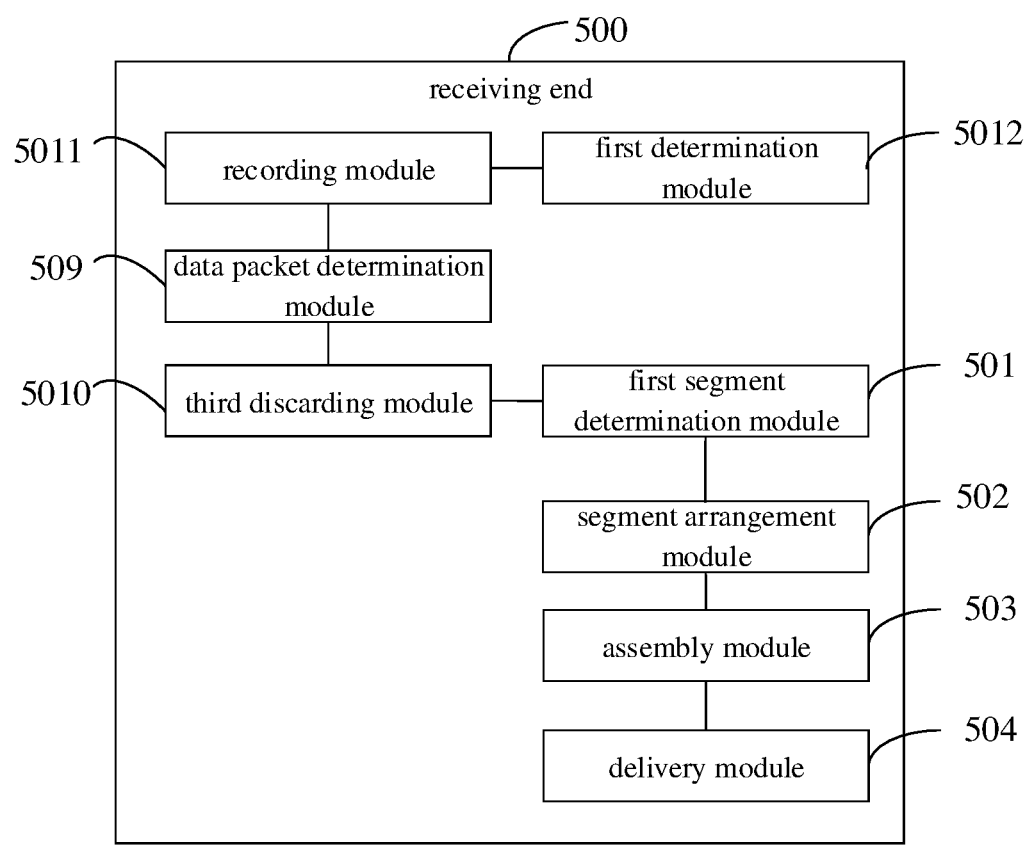
FIG. 11 is a seventh schematic view of a receiving end in the embodiment of the present disclosure.

Optionally, as shown in FIG. 11, the receiving end 500 further includes:

a first determination module 5012, configured to determine an upper-limit number and a lower-limit number of the preset length range of numbers.

Optionally, in the case that the number of the received data packet does not revert, the upper-limit number of the preset length range of numbers is: a maximum number among the numbers of the received data packets, the maximum number among the numbers of the received data packets plus 1, the maximum number among the numbers of the received data packets minus 1, or the lower-limit number of the preset length range of numbers plus the preset length range of numbers and minus 1;

in the case that the number of the received data packet reverts, the upper-limit number of the preset length range of numbers is: a maximum number among reverted numbers of the numbers of the received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, where the first calculation result is the lower-limit number of the preset length range of numbers plus the preset length range of numbers and minus 1.

Optionally, in the case that the number of the received data packet does not revert, the lower-limit number of the preset length range of numbers is: a minimum number among the numbers of the received data packets, the minimum number among the numbers of the received data packets plus 1, the minimum number among the numbers of the received data packets minus 1, or the upper-limit number of the preset length range of numbers minus the preset length range of numbers and plus 1;

in the case that the number of the received data packet reverts, the lower-limit number of the preset length range of numbers is: a minimum number among non-reverted numbers of the numbers of the received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, where the second calculation result is the upper-limit number of the preset length range of numbers minus the preset length range of numbers and plus 1.

Figure 12:
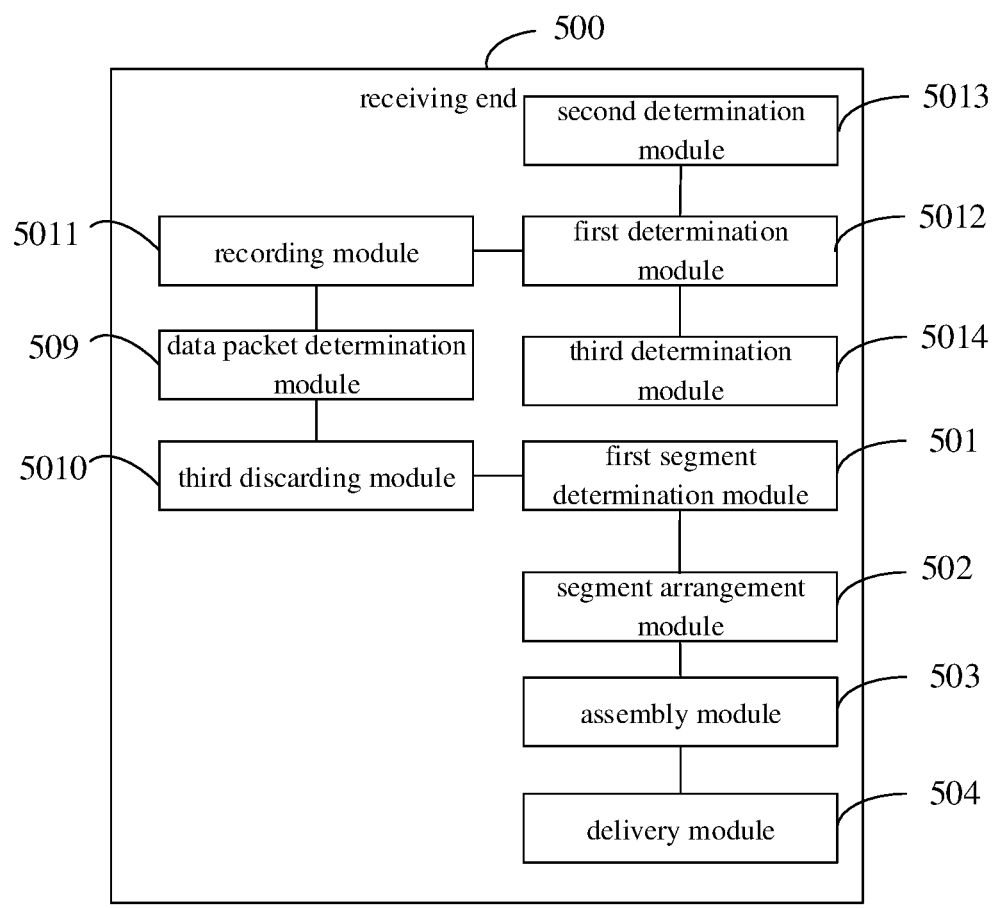
FIG. 12 is an eighth schematic view of a receiving end in the embodiment of the present disclosure.

Optionally, as shown in FIG. 12, the receiving end 500 further includes:

a second determination module 5013, configured to determine that the number of the received data packet reverts in the case that the number of the received data packet is less than or equal to the lower-limit number of the preset length range of numbers; or a third determination module 5014, configured to determine that the number of the received data packet reverts in the case that the number of the received data packet is less than or equal to a third calculation result, where the third calculation result is the lower-limit number of the preset length range of numbers minus the preset length range of numbers.

Optionally, the data packet determination module 509 is configured to determine whether the number of the target data packet is a number of a data packet delivered to the PDCP layer and determine that the target data packet is the duplicated RLC data packet in the case that the number of the target data packet is the number of the data packet delivered to the PDCP layer; or the data packet determination module 509 is configured to determine whether the number of the target data packet is a number of a data packet assembled successfully, and determine that the target data packet is the duplicated RLC data packet in the case that the number of the target data packet is the number of the data packet assembled successfully; or the data packet determination module 509 is configured to determine whether there is, within the preset length range of numbers, a data packet whose number is the same as the number of the target data packet, and determine that the target data packet is the duplicated RLC data packet in the case that there is, within the preset length range of numbers, the data packet whose number is the same as the number of the target data packet.

Figure 13:
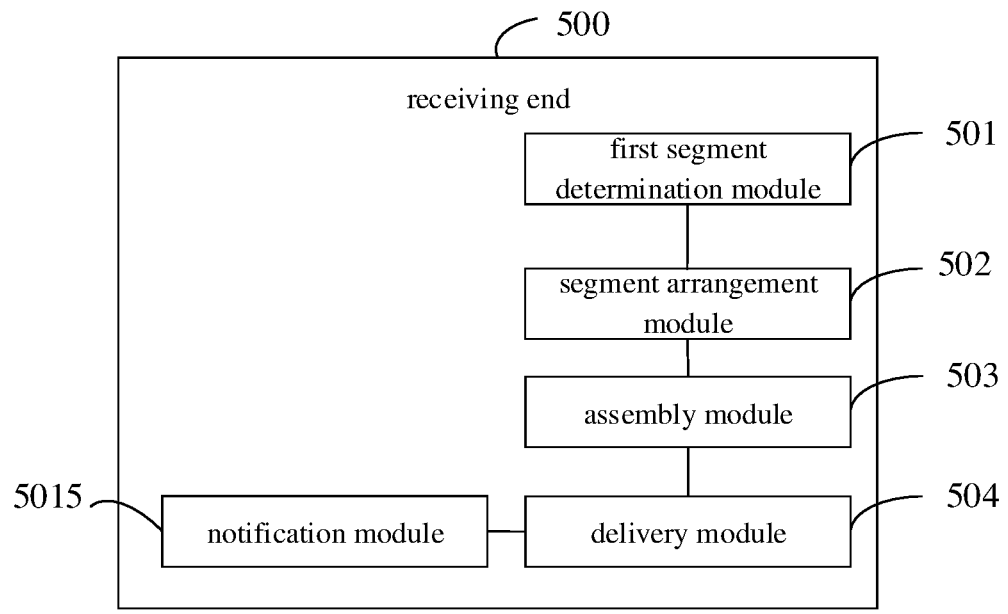
FIG. 13 is a ninth schematic view of a receiving end in the embodiment of the present disclosure.

Optionally, as shown in FIG. 13, the receiving end 500 further includes:

a notification module 5015, configured to notify the RLC layer of a failed RLC data packet which is determined to be received unsuccessfully in the case that the PDCP layer receives the RLC data packet delivered by the RLC layer.

Optionally, the notification module 5015 is configured to in the case that the PDCP layer receives the RLC data packet delivered by the RLC layer, record numbers of the RLC data packets received at the PDCP layer, determine a RLC-layer number of the failed RLC data packet which is determined to be received unsuccessfully, and notify the RLC layer of the RLC-layer number of the failed RLC data packet.

Figure 14:
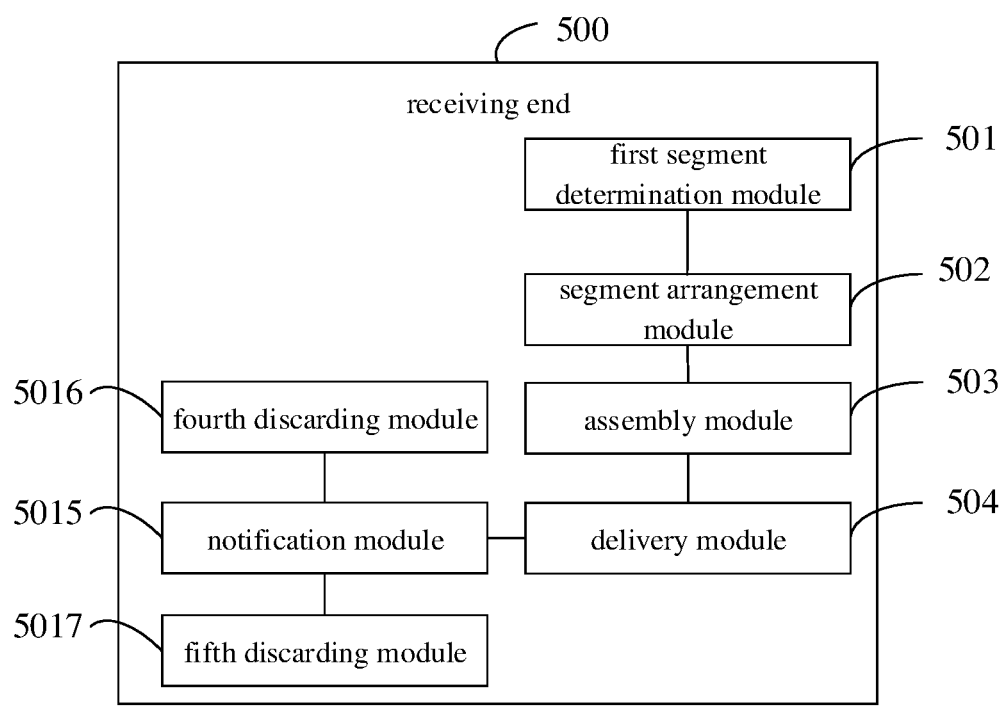
FIG. 14 is a tenth schematic view of a receiving end in the embodiment of the present disclosure.

Optionally, as shown in FIG. 14, the receiving end 500 further includes:

a fourth discarding module 5016, configured to, in the case that segments of the failed RLC data packet are stored at the RLC layer, discard the segments of the failed RLC data packet; or a fifth discarding module 5017, configured to, in the case that an assembly of the failed RLC data packet is underway at the RLC layer, terminate the assembly of the failed RLC data packet, terminate a timer initiated by the assembly and discard the segments used in the assembly process of the failed RLC data packet.

According to the receiving end of the present disclosure, in the case that the receiving end receives a target data packet at a RLC layer, the receiving end determines whether the target data packet is a segment of a RLC data packet based on a header of the target data packet; in the case that the target data packet is a segment of the RLC data packet, the receiving end arranges the segment of the RLC data packet received by the receiving end; in the case that the receiving end receives all segments of the RLC data packet, the receiving end assembles all segments of the RLC data packet to obtain the RLC data packet; and the receiving end delivers the RLC data packet to a PDCP layer, thereby assembling the segments at the RLC layer, improving the transmission performance of the communication system.

Figure 15:
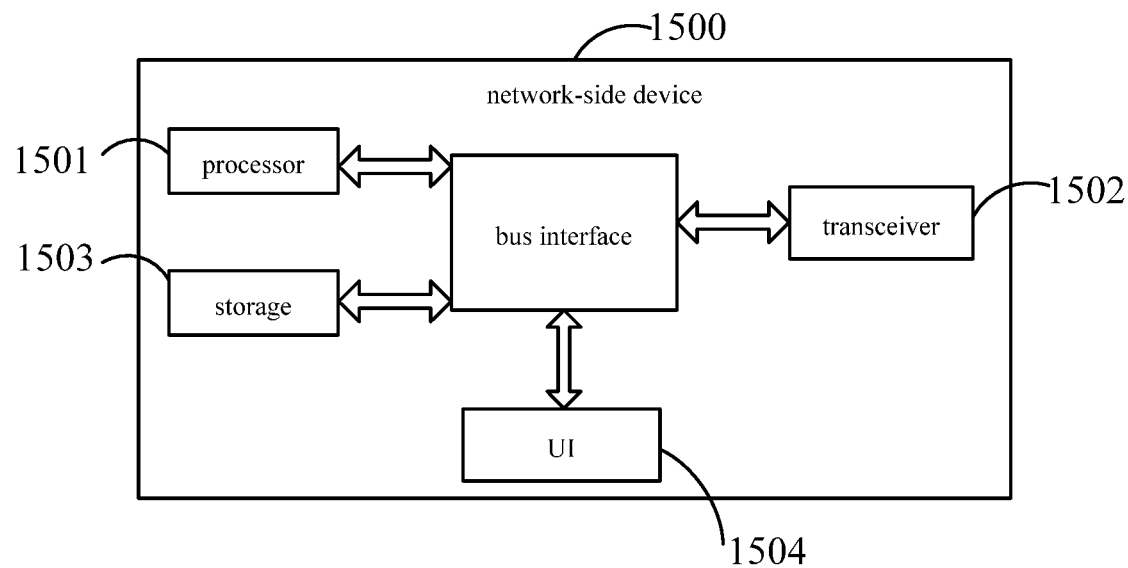
FIG. 15 is a schematic view of a network-side device in the embodiment of the present disclosure.

Referring to FIG. 15, a schematic view of a network-side device to which embodiments of this disclosure are applied is illustrated. The network-side device may implement detailed steps of the method of assembling segments of embodiments as shown in FIG. 1 and FIG. 2 and achieve the same effect. As shown in FIG. 15, the network-side device 1500 includes: a processor 1501, a transceiver 1502, a storage 1503, a User Interface (UI) 1504 and a bus interface.

The processor 1501 is configured to read programs in the storage 1503 to perform the following process:

determining, in the case that the receiving end receives a target data packet at a RLC layer, whether the target data packet is a segment of a RLC data packet based on a header of the target data packet; arranging the segment of the RLC data packet received by the receiving end, in the case that the target data packet is the segment of the RLC data packet; assembling, in the case that the receiving end receives all segments of the RLC data packet, all segments of the RLC data packet to obtain the RLC data packet; and delivering the RLC data packet to a PDCP layer.

The transceiver 1502 is configured to transmit and receive data under the control of the processor 1501.

In FIG. 15, a bus architecture may include any number of interconnected buses and bridges, and connects various circuits including one or more processors represented by the processor 1501 and storages represented by the storage 1503. The bus architecture may also connect various other circuits such as peripherals, voltage regulators and power management circuits, which is well known in the art. Therefore, a detailed description thereof is omitted herein. The bus interface acts as an interface. The transceiver 1502 may include multiple elements, such as a receiver and a transmitter, to allow for communication with various other apparatuses on the transmission medium. For various UEs, the UI 1504 may also be an interface capable of connecting externally or internally to a required device, and the device which may be connected includes, but not limited to: keypad, display, speaker, microphone, joystick and the like.

The processor 1501 is configured to supervise the bus architecture and normal operation and the storage 1503 may store the data being used by the processor 1501 during operation.

Optionally, the processor 1501 is further configured to: determine whether the header of the target data packet includes a format indication of a segmented packet, and determine that the target data packet is the segment of the RLC data packet in the case that the header of the target data packet includes the format indication of the segmented packet; or determine whether the header of the target data packet includes segment position information, and determining that the target data packet is the segment of the RLC data packet in the case that the header of the target data packet includes the segment position information.

Optionally, the processor 1501 is further configured to: determine whether the target data packet is a duplicated segment of the segment of the RLC data packet received by the receiving end, in the case that the target data packet is the segment of the RLC data packet, and discard the target data packet, in the case that the target data packet is the duplicated segment of the segment of the RLC data packet received by the receiving end.

Optionally, the processor 1501 is further configured to: arrange the segments of the RLC data packet received by the receiving end in an order of segmentation, or arrange the segments of the RLC data packet received by the receiving end randomly.

Optionally, the processor 1501 is further configured to: terminate an assembly of the RLC data packet and discarding the segment of the RLC data packet stored by the receiving end, in the case that a timer expires.

Optionally, the timer includes: a timer initiated in the case that the receiving end receives the segment of the RLC data packet for the first time; or a timer initiated in the case that the receiving end receives a segment of the RLC data packet again after receiving the segment of the RLC data packet; or a timer initiated in the case that a segment between two adjacent segments is not received after the receiving end arranges the segments of the RLC data packet received by the receiving end in the order of segmentation.

Optionally, the processor 1501 is further configured to: terminate the timer, in the case that the receiving end receives all segments of the RLC data packet and the timer does not expire.

Optionally, the processor 1501 is further configured to: determine whether the target data packet is a duplicated RLC data packet based on a number of the target data packet, in the case that the receiving end receives the target data packet at the RLC layer; discard the target data packet, in the case that the target data packet is the duplicated RLC data packet; and determine whether the target data packet is the segment of the RLC data packet based on the header of the target data packet, in the case that the target data packet is not the duplicated RLC data packet.

Optionally, the processor 1501 is further configured to: record status information of the RLC layer, where the status information includes status and numbers of the RLC data packets within a preset length range of numbers, and the status of the RLC data packets include: delivered to the PDCP layer, assembled successfully, being assembled or not received.

Optionally, the processor 1501 is further configured to: determine an upper-limit number and a lower-limit number of the preset length range of numbers.

Optionally, in the case that the number of the received data packet does not revert, the upper-limit number of the preset length range of numbers is: a maximum number among the numbers of the received data packets, the maximum number among the numbers of the received data packets plus 1, the maximum number among the numbers of the received data packets minus 1, or the lower-limit number of the preset length range of numbers plus the preset length range of numbers and minus 1;

in the case that the number of the received data packet reverts, the upper-limit number of the preset length range of numbers is: a maximum number among reverted numbers of the numbers of the received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, where the first calculation result is the lower-limit number of the preset length range of numbers plus the preset length range of numbers and minus 1.

Optionally, in the case that the number of the received data packet does not revert, the lower-limit number of the preset length range of numbers is: a minimum number among the numbers of the received data packets, the minimum number among the numbers of the received data packets plus 1, the minimum number among the numbers of the received data packets minus 1, or the upper-limit number of the preset length range of numbers minus the preset length range of numbers and plus 1;

in the case that the number of the received data packet reverts, the lower-limit number of the preset length range of numbers is: a minimum number among non-reverted numbers of the numbers of the received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, where the second calculation result is the upper-limit number of the preset length range of numbers minus the preset length range of numbers and plus 1.

Optionally, the processor 1501 is further configured to: determine that the number of the received data packet reverts, in the case that the number of the received data packet is less than or equal to the lower-limit number of the preset length range of numbers, or determine that the number of the received data packet reverts, in the case that the number of the received data packet is less than or equal to a third calculation result, where the third calculation result is the lower-limit number of the preset length range of numbers minus the preset length range of numbers.

Optionally, the processor 1501 is further configured to: determine whether the number of the target data packet is a number of a data packet delivered to the PDCP layer, and determining that the target data packet is the duplicated RLC data packet in the case that the number of the target data packet is the number of the data packet delivered to the PDCP layer; or determine whether the number of the target data packet is a number of a data packet assembled successfully, and determining that the target data packet is the duplicated RLC data packet in the case that the number of the target data packet is the number of the data packet assembled successfully; or determine whether there is, within the preset length range of numbers, a data packet whose number is the same as the number of the target data packet, and determining that the target data packet is the duplicated RLC data packet in the case that there is, within the preset length range of numbers, the data packet whose number is the same as the number of the target data packet.

Optionally, the processor 1501 is further configured to: notify the RLC layer of a failed RLC data packet which is determined to be received unsuccessfully, in the case that the PDCP layer receives the RLC data packet delivered by the RLC layer.

Optionally, the processor 1501 is further configured to: record numbers of the RLC data packets received at the PDCP layer, determine a RLC-layer number of the failed RLC data packet which is determined to be received unsuccessfully, and notifying the RLC layer of the RLC-layer number of the failed RLC data packet.

Optionally, the processor 1501 is further configured to: in the case that segments of the failed RLC data packet are stored at the RLC layer, discard the segments of the failed RLC data packet; or in the case that an assembly of the failed RLC data packet is underway at the RLC layer, terminate the assembly of the failed RLC data packet, terminate a timer initiated by the assembly and discard the segments used in the assembly of the failed RLC data packet.

The network-side device may be a TRP or a base station, the base station may be a macro base station such as LTE eNB and 5G NR NB. Alternatively, the network-side device 12 may be an AP.

According to the network-side device of the present disclosure, in the case that the network-side device receives a target data packet at a RLC layer, the network-side device determines whether the target data packet is a segment of a RLC data packet based on a header of the target data packet; in the case that the target data packet is a segment of the RLC data packet, the network-side device arranges the segment of the RLC data packet received by the receiving end; in the case that the network-side device receives all segments of the RLC data packet, the network-side device assembles all segments of the RLC data packet to obtain the RLC data packet; and the network-side device delivers the RLC data packet to a PDCP layer, thereby assembling the segments at the RLC layer, improving the transmission performance of the communication system.

Figure 16:
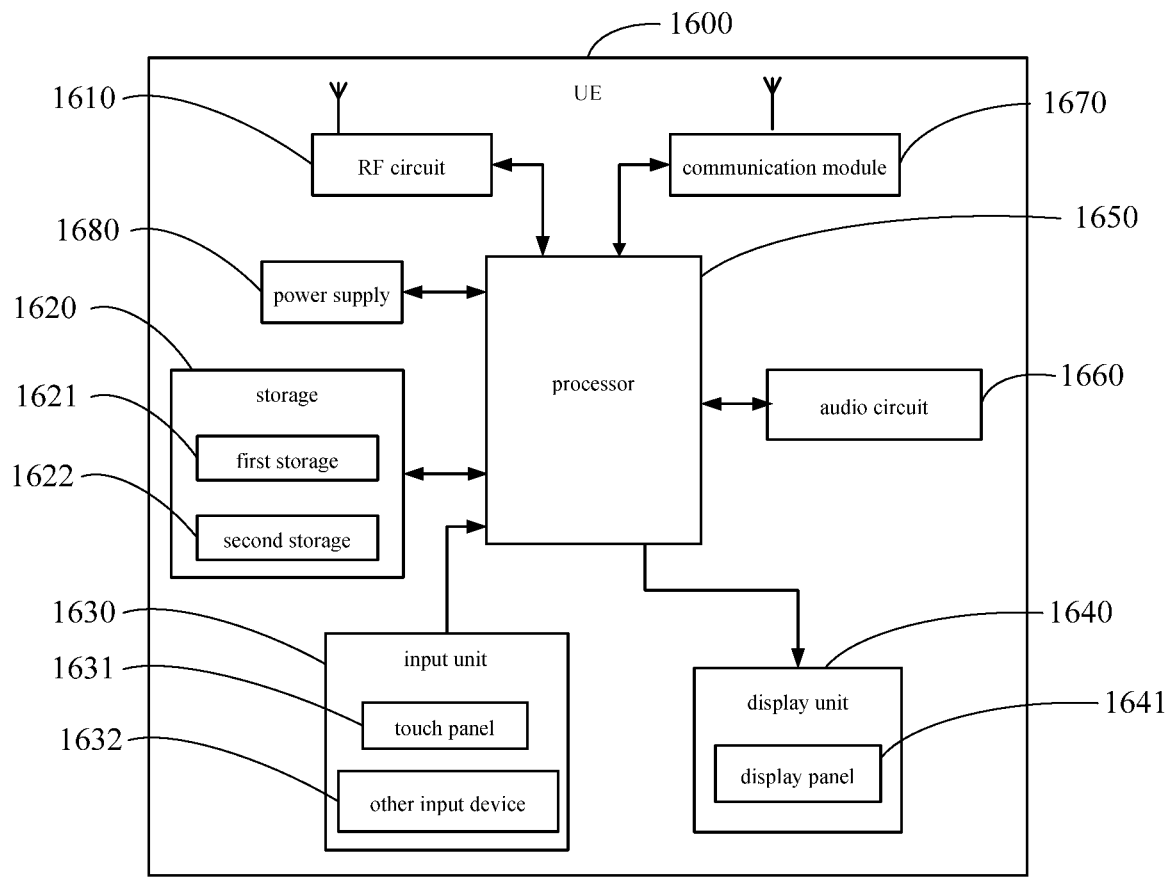
FIG. 16 is a schematic view of a User Equipment (UE) in the embodiment of the present disclosure.

Referring to FIG. 16, a schematic view of a UE to which embodiments of this disclosure are applied is illustrated. The UE may implement detailed steps of the method of assembling segments of embodiments as shown in FIG. 1 and FIG. 2 and achieve the same effect. As shown in FIG. 16, the UE 1600 includes a Radio Freq (RF) circuit 1610, a storage 1620, an input unit 1630, a display unit 1640, a processor 1650, an audio circuit 1660, a communication module 1670 and a power supply 1680.

The input unit 1630 may be configured to receive digit or character information input by a user, and generate input signal related to the user settings and functional control of the UE 1600. Specifically, in embodiments of this disclosure, the input unit 1630 may include a touch panel 1631. The touch panel 1631, aka touchpad, may sense user's touch actions on or in proximity to the touch panel (e.g., a user performs touch actions on the touch panel 1631 with any suitable object or accessory such as finger and stylus), and drive a corresponding connected device according to preset programs. Optionally, the touch panel 1631 may include a touch sensing device and a touch controller. The touch sensing device senses the location of user's touch, detects signal caused by the touch and transfers the signal to the touch controller; the touch controller receives touch information from the touch sensing device, converts the information into touch point coordinates and transfers the coordinates to the processor 1650, and the touch controller may receive commands from the processor 1650 and execute the commands. Further, the touch panel 1631 may be implemented with technologies such as resistive, capacitive, infrared (IR) and Surface Acoustic Wave (SAW). In addition to the touch panel 1631, the input unit 1630 may include other input device 1632, which may include, but not limited to one or more of physical keyboard, function key (e.g., volume control button, switch button and the like), track ball, mouse, joystick, etc.

The display unit 1640 may be configured to display information input by a user or information meant for a user, as well as various menu interfaces of UE 1600. The display unit 1640 may include a display panel 1641, and optionally, the display panel 1641 may be constructed based on technologies such as LCD or Organic Light-Emitting Diode (OLED).

It is noted, the touch panel 1631 may overlie the display panel 1641, to form a touchscreen. The touchscreen detects touch actions performed thereon or in proximity thereto and transfers the detected actions to the processor 1650 to identify a type of the touch event, and then the processor 1650 provides visual output on the touchscreen in accordance with the type of the touch event.

The touchscreen includes an application interface display area and a common controls display area. The layout of these display areas is not limited, and may be vertical, horizontal or in other manner as long as the display areas may be distinguished from each other. The application interface display area may be used to display an application interface. Each interface may include interface elements such as icons and/or widgets of at least one application. The application interface display area may also be an empty interface void of any content. The common controls display area is used to display frequently used controls, e.g., setting button, interface number, scroll bar, application icon such as phone book icon, etc.

The processor 1650 acts as a control center of the UE 1600 and is connected to various parts of the cell phone via a variety of interfaces and lines. The processor 1650 performs various functions of UE 1600 and processes data by running or executing software programs and/or modules stored in a first storage 1621 and calling data stored in a second storage 1622, so as to monitor and control the general operation of UE 1600. Optionally, the processor 1650 may include one or more processing units.

In embodiments of this disclosure, by calling software programs and/or modules stored in the first storage 1621 and/or data stored in the second storage 1622, the processor 1650 is configured to: determine, in the case that the receiving end receives a target data packet at a RLC layer, whether the target data packet is a segment of a RLC data packet based on a header of the target data packet; arrange the segment of the RLC data packet received by the receiving end, in the case that the target data packet is the segment of the RLC data packet; assemble, in the case that the receiving end receives all segments of the RLC data packet, all segments of the RLC data packet to obtain the RLC data packet; and deliver the RLC data packet to a PDCP layer.

Optionally, the processor 1650 is further configured to: determine whether the header of the target data packet includes a format indication of a segmented packet, and determine that the target data packet is the segment of the RLC data packet in the case that the header of the target data packet includes the format indication of the segmented packet; or determine whether the header of the target data packet includes segment position information, and determining that the target data packet is the segment of the RLC data packet in the case that the header of the target data packet includes the segment position information.

Optionally, the processor 1650 is further configured to: determine whether the target data packet is a duplicated segment of the segment of the RLC data packet received by the receiving end, in the case that the target data packet is the segment of the RLC data packet, and discard the target data packet, in the case that the target data packet is the duplicated segment of the segment of the RLC data packet received by the receiving end.

Optionally, the processor 1650 is further configured to: arrange the segments of the RLC data packet received by the receiving end in an order of segmentation, or arrange the segments of the RLC data packet received by the receiving end randomly.

Optionally, the processor 1650 is further configured to: terminate an assembly of the RLC data packet and discarding the segment of the RLC data packet stored by the receiving end, in the case that a timer expires.

Optionally, the timer includes: a timer initiated in the case that the receiving end receives the segment of the RLC data packet for the first time; or a timer initiated in the case that the receiving end receives a segment of the RLC data packet again after receiving the segment of the RLC data packet; or a timer initiated in the case that a segment between two adjacent segments is not received after the receiving end arranges the segments of the RLC data packet received by the receiving end in the order of segmentation.

Optionally, the processor 1650 is further configured to: terminate the timer, in the case that the receiving end receives all segments of the RLC data packet and the timer does not expire.

Optionally, the processor 1650 is further configured to: determine whether the target data packet is a duplicated RLC data packet based on a number of the target data packet, in the case that the receiving end receives the target data packet at the RLC layer; discard the target data packet, in the case that the target data packet is the duplicated RLC data packet; and determine whether the target data packet is the segment of the RLC data packet based on the header of the target data packet, in the case that the target data packet is not the duplicated RLC data packet.

Optionally, the processor 1650 is further configured to: record status information of the RLC layer, where the status information includes status and numbers of the RLC data packets within a preset length range of numbers, and the status of the RLC data packets include: delivered to the PDCP layer, assembled successfully, being assembled or not received.

Optionally, the processor 1650 is further configured to: determine an upper-limit number and a lower-limit number of the preset length range of numbers.

Optionally, in the case that the number of the received data packet does not revert, the upper-limit number of the preset length range of numbers is: a maximum number among the numbers of the received data packets, the maximum number among the numbers of the received data packets plus 1, the maximum number among the numbers of the received data packets minus 1, or the lower-limit number of the preset length range of numbers plus the preset length range of numbers and minus 1;

in the case that the number of the received data packet reverts, the upper-limit number of the preset length range of numbers is: a maximum number among reverted numbers of the numbers of the received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, where the first calculation result is the lower-limit number of the preset length range of numbers plus the preset length range of numbers and minus 1.

Optionally, in the case that the number of the received data packet does not revert, the lower-limit number of the preset length range of numbers is: a minimum number among the numbers of the received data packets, the minimum number among the numbers of the received data packets plus 1, the minimum number among the numbers of the received data packets minus 1, or the upper-limit number of the preset length range of numbers minus the preset length range of numbers and plus 1;

in the case that the number of the received data packet reverts, the lower-limit number of the preset length range of numbers is: a minimum number among non-reverted numbers of the numbers of the received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, where the second calculation result is the upper-limit number of the preset length range of numbers minus the preset length range of numbers and plus 1.

Optionally, the processor 1650 is further configured to: determine that the number of the received data packet reverts, in the case that the number of the received data packet is less than or equal to the lower-limit number of the preset length range of numbers, or determine that the number of the received data packet reverts, in the case that the number of the received data packet is less than or equal to a third calculation result, where the third calculation result is the lower-limit number of the preset length range of numbers minus the preset length range of numbers.

Optionally, the processor 1650 is further configured to: determine whether the number of the target data packet is a number of a data packet delivered to the PDCP layer, and determining that the target data packet is the duplicated RLC data packet in the case that the number of the target data packet is the number of the data packet delivered to the PDCP layer; or determine whether the number of the target data packet is a number of a data packet assembled successfully, and determining that the target data packet is the duplicated RLC data packet in the case that the number of the target data packet is the number of the data packet assembled successfully; or determine whether there is, within the preset length range of numbers, a data packet whose number is the same as the number of the target data packet, and determining that the target data packet is the duplicated RLC data packet in the case that there is, within the preset length range of numbers, the data packet whose number is the same as the number of the target data packet.

Optionally, the processor 1650 is further configured to: notify the RLC layer of a failed RLC data packet which is determined to be received unsuccessfully, in the case that the PDCP layer receives the RLC data packet delivered by the RLC layer.

Optionally, the processor 1650 is further configured to: record numbers of the RLC data packets received at the PDCP layer, determine a RLC-layer number of the failed RLC data packet which is determined to be received unsuccessfully, and notifying the RLC layer of the RLC-layer number of the failed RLC data packet.

Optionally, the processor 1650 is further configured to: in the case that segments of the failed RLC data packet are stored at the RLC layer, discard the segments of the failed RLC data packet; or in the case that an assembly of the failed RLC data packet is underway at the RLC layer, terminate the assembly of the failed RLC data packet, terminate a timer initiated by the assembly and discard the segments used in the assembly of the failed RLC data packet.

According to the UE of the present disclosure, in the case that the UE receives a target data packet at a RLC layer, the receiving end determines whether the target data packet is a segment of a RLC data packet based on a header of the target data packet; in the case that the target data packet is a segment of the RLC data packet, the UE arranges the segment of the RLC data packet received by the receiving end; in the case that the UE receives all segments of the RLC data packet, the UE assembles all segments of the RLC data packet to obtain the RLC data packet; and the UE delivers the RLC data packet to a PDCP layer, thereby assembling the segments at the RLC layer, improving the transmission performance of the communication system.

A person skilled in the art may be aware that, in the examples described in combination with the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a Universal Serial Bus (USB) flash drive, a removable hard disk, a ROM, a RAM, a magnetic disk, or an optical disc.

The above descriptions merely describe specific embodiments of this disclosure, but the scope of this disclosure is not limited thereto. Changes or alternatives which can easily occur to those skilled in the art within the technical scope disclosed in this disclosure shall fall within the scope of this disclosure. Therefore, the scope of this disclosure is defined by the claims.

What is claimed is:

1. A method of assembling segments, applied to a receiving end and comprising:
    determining, in the case that the receiving end receives a target data packet at a Radio Link Control (RLC) layer, whether the target data packet is a segment of a RLC data packet based on a header of the target data packet;
    arranging the segment of the RLC data packet received by the receiving end, in the case that the target data packet is the segment of the RLC data packet;
    assembling, in the case that the receiving end receives all segments of the RLC data packet, all segments of the RLC data packet to obtain the RLC data packet; and
    delivering the RLC data packet to a Packet Data Convergence Protocol (PDCP) layer;
    wherein the method further comprises:
    notifying the RLC layer of a failed RLC data packet which is determined to be received unsuccessfully, in the case that the PDCP layer receives the RLC data packet delivered by the RLC layer;
    wherein the notifying the RLC layer of the failed RLC data packet which is determined to be received unsuccessfully comprises:
    recording numbers of the RLC data packets received at the PDCP layer, determining a RLC-layer number of the failed RLC data packet which is determined to be received unsuccessfully, and notifying the RLC layer of the RLC-layer number of the failed RLC data packet;
    wherein subsequent to the notifying the RLC layer of the failed RLC data packet which is determined to be received unsuccessfully, the method further comprises:
    in the case that segments of the failed RLC data packet are stored at the RLC layer, discarding the segments of the failed RLC data packet; or
    in the case that an assembly of the failed RLC data packet is underway at the RLC layer, terminating the assembly of the failed RLC data packet, terminating a timer initiated by the assembly and discarding the segments used in the assembly of the failed RLC data packet.

2. The method according to claim 1, wherein the determining whether the target data packet is the segment of the RLC data packet based on the header of the target data packet comprises:

determining whether the header of the target data packet comprises a format indication of a segmented packet, and determining that the target data packet is the segment of the RLC data packet in the case that the header of the target data packet comprises the format indication of the segmented packet; or determining whether the header of the target data packet comprises segment position information, and determining that the target data packet is the segment of the RLC data packet in the case that the header of the target data packet comprises the segment position information.

3. The method according to claim 1, wherein subsequent to the determining whether the target data packet is the segment of the RLC data packet based on the header of the target data packet, the method further comprises:

determining whether the target data packet is a duplicated segment of the segment of the RLC data packet received by the receiving end, in the case that the target data packet is the segment of the RLC data packet; and discarding the target data packet, in the case that the target data packet is the duplicated segment of the segment of the RLC data packet received by the receiving end.

4. The method according to claim 1, wherein the arranging the segment of the RLC data packet received by the receiving end comprises:

arranging the segments of the RLC data packet received by the receiving end in an order of segmentation; or arranging the segments of the RLC data packet received by the receiving end randomly.

5. The method according to claim 1, wherein subsequent to the determining whether the target data packet is the segment of the RLC data packet based on the header of the target data packet, the method further comprises:

terminating an assembly of the RLC data packet and discarding the segment of the RLC data packet stored by the receiving end, in the case that a timer expires;

wherein the timer comprises:

a timer initiated in the case that the receiving end receives the segment of the RLC data packet for the first time; or a timer initiated in the case that the receiving end receives a segment of the RLC data packet again after receiving the segment of the RLC data packet; or a timer initiated in the case that a segment between two adjacent segments is not received after the receiving end arranges the segments of the RLC data packet received by the receiving end in the order of segmentation;

the method further comprises:

terminating the timer, in the case that the receiving end receives all segments of the RLC data packet and the timer does not expire.

6. The method according to claim 1, wherein prior to the determining whether the target data packet is the segment of the RLC data packet based on the header of the target data packet, the method further comprises:

determining whether the target data packet is a duplicated RLC data packet based on a number of the target data packet, in the case that the receiving end receives the target data packet at the RLC layer;

discarding the target data packet, in the case that the target data packet is the duplicated RLC data packet; and determining whether the target data packet is the segment of the RLC data packet based on the header of the target data packet, in the case that the target data packet is not the duplicated RLC data packet.

7. The method according to claim 6, further comprising:
recording status information of the RLC layer;
wherein the status information comprises status and numbers of the RLC data packets within a preset length range of numbers, and the status of the RLC data packets comprise: delivered to the PDCP layer, assembled successfully, being assembled or not received.

8. The method according to claim 7, further comprising:
determining an upper-limit number and a lower-limit number of the preset length range of numbers;

wherein in the case that the number of the received data packet does not revert, the upper-limit number of the preset length range of numbers is: a maximum number among the numbers of the received data packets, the maximum number among the numbers of the received data packets plus 1, the maximum number among the numbers of the received data packets minus 1, or the lower-limit number of the preset length range of numbers plus the preset length range of numbers and minus 1;

in the case that the number of the received data packet reverts, the upper-limit number of the preset length range of numbers is: a maximum number among reverted numbers of the numbers of the received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, wherein the first calculation result is the lower-limit number of the preset length range of numbers plus the preset length range of numbers and minus 1;

or, in the case that the number of the received data packet does not revert, the lower-limit number of the preset length range of numbers is: a minimum number among the numbers of the received data packets, the minimum number among the numbers of the received data packets plus 1, the minimum number among the numbers of the received data packets minus 1, or the upper-limit number of the preset length range of numbers minus the preset length range of numbers and plus 1;

in the case that the number of the received data packet reverts, the lower-limit number of the preset length range of numbers is: a minimum number among non-reverted numbers of the numbers of the received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, wherein the second calculation result is the upper-limit number of the preset length range of numbers minus the preset length range of numbers and plus 1;

or, prior to the determining the upper-limit number and the lower-limit number of the preset length range of numbers, the method further comprises:

determining that the number of the received data packet reverts, in the case that the number of the received data packet is less than or equal to the lower-limit number of the preset length range of numbers; or determining that the number of the received data packet reverts, in the case that the number of the received data packet is less than or equal to a third calculation result, wherein the third calculation result is the lower-limit number of the preset length range of numbers minus the preset length range of numbers.

9. The method according to claim 6, wherein the determining whether the target data packet is the duplicated RLC data packet based on the number of the target data packet comprises:
determining whether the number of the target data packet is a number of a data packet delivered to the PDCP layer, and determining that the target data packet is the duplicated RLC data packet in the case that the number of the target data packet is the number of the data packet delivered to the PDCP layer; or
determining whether the number of the target data packet is a number of a data packet assembled successfully, and determining that the target data packet is the duplicated RLC data packet in the case that the number of the target data packet is the number of the data packet assembled successfully; or
determining whether there is, within the preset length range of numbers, a data packet whose number is the same as the number of the target data packet, and determining that the target data packet is the duplicated RLC data packet in the case that there is, within the preset length range of numbers, the data packet whose number is the same as the number of the target data packet.

10. A receiving end, comprising a processor and a storage configured to store a computer program configured to be executed by the processor, wherein the processor is configured to execute the computer program to:
determine, in the case that the receiving end receives a target data packet at a Radio Link Control (RLC) layer, whether the target data packet is a segment of a RLC data packet based on a header of the target data packet;
arrange the segment of the RLC data packet received by the receiving end in the case that the target data packet is the segment of the RLC data packet;
assemble, in the case that the receiving end receives all segments of the RLC data packet, all segments of the RLC data packet to obtain the RLC data packet; and
deliver the RLC data packet to a Packet Data Convergence Protocol (PDCP) layer;
wherein the processor is configured to execute the computer program to:
notify the RLC layer of a failed RLC data packet which is determined to be received unsuccessfully in the case that the PDCP layer receives the RLC data packet delivered by the RLC layer;
wherein the processor is configured to execute the computer program to: in the case that the PDCP layer receives the RLC data packet delivered by the RLC layer, record numbers of the RLC data packets received at the PDCP layer, determine a RLC-layer number of the failed RLC data packet which is determined to be received unsuccessfully, and notify the RLC layer of the RLC-layer number of the failed RLC data packet;
wherein the processor is configured to execute the computer program to:
in the case that segments of the failed RLC data packet are stored at the RLC layer, discard the segments of the failed RLC data packet; or
in the case that an assembly of the failed RLC data packet is underway at the RLC layer, terminate the assembly of the failed RLC data packet, terminate a timer initiated by the assembly and discard the segments used in the assembly process of the failed RLC data packet.

11. The receiving end according to claim 10, wherein the processor is configured to execute the computer program to:
determine whether the header of the target data packet comprises a format indication of a segmented packet, and determine that the target data packet is the segment of the RLC data packet in the case that the header of the target data packet comprises the format indication of the segmented packet; or
determine whether the header of the target data packet comprises segment position information, and determine that the target data packet is the segment of the RLC data packet in the case that the header of the target data packet comprises the segment position information.

12. The receiving end according to claim 10, wherein the processor is configured to execute the computer program to:
determine whether the target data packet is a duplicated segment of the segment of the RLC data packet received by the receiving end in the case that the target data packet is the segment of the RLC data packet; and
discard the target data packet in the case that the target data packet is the duplicated segment of the segment of the RLC data packet received by the receiving end.

13. The receiving end according to claim 10, wherein the processor is configured to execute the computer program to:
arrange the segments of the RLC data packet received by the receiving end in an order of segmentation; or
arrange the segments of the RLC data packet received by the receiving end randomly.

14. The receiving end according to claim 10, wherein the processor is configured to execute the computer program to:
terminate an assembly of the RLC data packet and discard the segment of the RLC data packet stored by the receiving end in the case that a timer expires;
wherein the timer comprises:
a timer initiated in the case that the receiving end receives the segment of the RLC data packet for the first time; or
a timer initiated in the case that the receiving end receives a segment of the RLC data packet again after receiving the segment of the RLC data packet; or
a timer initiated in the case that a segment between two adjacent segments is not received after the receiving end arranges the segments of the RLC data packet received by the receiving end in the order of segmentation;
wherein the processor is configured to execute the computer program to terminate the timer in the case that the receiving end receives all segments of the RLC data packet and the timer does not expire.

15. The receiving end according to claim 10, wherein the processor is configured to execute the computer program to:
determine whether the target data packet is a duplicated RLC data packet based on a number of the target data packet in the case that the receiving end receives the target data packet at the RLC layer; and
discard the target data packet in the case that the target data packet is the duplicated RLC data packet;
determine whether the target data packet is the segment of the RLC data packet based on the header of the target data packet in the case that the target data packet is not the duplicated RLC data packet.

16. The receiving end according to claim 15, wherein the processor is configured to execute the computer program to:

record status information of the RLC layer;
wherein the status information comprises status and numbers of the RLC data packets within a preset length range of numbers, and the status of the RLC data packets comprise: delivered to the PDCP layer, assembled successfully, being assembled or not received.

17. The receiving end according to claim 16, wherein the processor is configured to execute the computer program to:
determine an upper-limit number and a lower-limit number of the preset length range of numbers;
wherein in the case that the number of the received data packet does not revert, the upper-limit number of the preset length range of numbers is: a maximum number among the numbers of the received data packets, the maximum number among the numbers of the received data packets plus 1, the maximum number among the numbers of the received data packets minus 1, or the lower-limit number of the preset length range of numbers plus the preset length range of numbers and minus 1;
in the case that the number of the received data packet reverts, the upper-limit number of the preset length range of numbers is: a maximum number among reverted numbers of the numbers of the received data packets, the maximum number among the reverted numbers of the numbers of the received data packets plus 1, the maximum number among the reverted numbers of the numbers of the received data packets minus 1, or a number obtained from a remainder operation to the preset length range of numbers by a first calculation result, wherein the first calculation result is the lower-limit number of the preset length range of numbers plus the preset length range of numbers and minus 1;
or,
in the case that the number of the received data packet does not revert, the lower-limit number of the preset length range of numbers is: a minimum number among the numbers of the received data packets, the minimum number among the numbers of the received data packets plus 1, the minimum number among the numbers of the received data packets minus 1, or the upper-limit number of the preset length range of numbers minus the preset length range of numbers and plus 1;
in the case that the number of the received data packet reverts, the lower-limit number of the preset length range of numbers is: a minimum number among non-reverted numbers of the numbers of the received data packets, the minimum number among the non-reverted numbers of the numbers of the received data packets plus 1, the minimum number among the non-reverted numbers of the numbers of the received data packets minus 1, or a number obtained from a second calculation result plus a preset maximum number, wherein the second calculation result is the upper-limit number of the preset length range of numbers minus the preset length range of numbers and plus 1;
or,
the processor is configured to execute the computer program to: prior to the determining the upper-limit number and the lower-limit number of the preset length range of numbers,
determine that the number of the received data packet reverts, in the case that the number of the received data packet is less than or equal to the lower-limit number of the preset length range of numbers; or determine that the number of the received data packet reverts, in the case that the number of the received data packet is less than or equal to a third calculation result, wherein the third calculation result is the lower-limit number of the preset length range of numbers minus the preset length range of numbers.

18. The receiving end according to claim 15, wherein the processor is configured to execute the computer program to determine whether the number of the target data packet is a number of a data packet delivered to the PDCP layer and determine that the target data packet is the duplicated RLC data packet in the case that the number of the target data packet is the number of the data packet delivered to the PDCP layer; or
determine whether the number of the target data packet is a number of a data packet assembled successfully, and determine that the target data packet is the duplicated RLC data packet in the case that the number of the target data packet is the number of the data packet assembled successfully; or
determine whether there is, within the preset length range of numbers, a data packet whose number is the same as the number of the target data packet, and determine that the target data packet is the duplicated RLC data packet in the case that there is, within the preset length range of numbers, the data packet whose number is the same as the number of the target data packet.

19. A non-transitory computer readable storage medium storing a computer program, wherein the computer program is configured to be executed by a processor to:
determine, in the case that the receiving end receives a target data packet at a Radio Link Control (RLC) layer, whether the target data packet is a segment of a RLC data packet based on a header of the target data packet;
arrange the segment of the RLC data packet received by the receiving end, in the case that the target data packet is the segment of the RLC data packet;
assemble, in the case that the receiving end receives all segments of the RLC data packet, all segments of the RLC data packet to obtain the RLC data packet; and
deliver the RLC data packet to a Packet Data Convergence Protocol (PDCP) layer;
wherein the computer program is configured to be executed by the processor to:
notify the RLC layer of a failed RLC data packet which is determined to be received unsuccessfully, in the case that the PDCP layer receives the RLC data packet delivered by the RLC layer;
wherein the computer program is configured to be executed by the processor to:
recording numbers of the RLC data packets received at the PDCP layer, determining a RLC-layer number of the failed RLC data packet which is determined to be received unsuccessfully, and notifying the RLC layer of the RLC-layer number of the failed RLC data packet;
wherein subsequent to the notifying the RLC layer of the failed RLC data packet which is determined to be received unsuccessfully, the computer program is configured to be executed by the processor to:
in the case that segments of the failed RLC data packet are stored at the RLC layer, discarding the segments of the failed RLC data packet; or
in the case that an assembly of the failed RLC data packet is underway at the RLC layer, terminating the assembly of the failed RLC data packet, terminating a timer initiated by the assembly and discarding the segments used in the assembly of the failed RLC data packet.

20. The non-transitory computer readable storage medium according to claim 19, wherein the computer program is configured to be executed by the processor to:
- determine whether the target data packet is a duplicated segment of the segment of the RLC data packet received by the receiving end, in the case that the target data packet is the segment of the RLC data packet; and
- discard the target data packet, in the case that the target data packet is the duplicated segment of the segment of the RLC data packet received by the receiving end.

* * * * *